[12] United States Patent
Huang et al.

US010873936B2

(10) Patent No.: US 10,873,936 B2
(45) Date of Patent: Dec. 22, 2020

(54) METHOD AND APPARATUS FOR DETERMINING CODEBOOK SIZE IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/362,065

(22) Filed: Mar. 22, 2019

(65) Prior Publication Data

US 2019/0306841 A1  Oct. 3, 2019

Related U.S. Application Data

(60) Provisional application No. 62/649,399, filed on Mar. 28, 2018.

(51) Int. Cl.
H04W 72/04 (2009.01)
H04W 76/34 (2018.01)
H04L 5/00 (2006.01)
H04W 92/10 (2009.01)
H04W 72/12 (2009.01)

(52) U.S. Cl.
CPC ......... *H04W 72/042* (2013.01); *H04L 5/0055* (2013.01); *H04L 5/0098* (2013.01); *H04W 76/34* (2018.02); *H04L 5/001* (2013.01); *H04L 5/0053* (2013.01); *H04W 72/0446* (2013.01); (Continued)

(58) Field of Classification Search
CPC .............. H04W 72/042; H04W 76/34; H04W 72/1289; H04W 72/0446; H04W 92/10; H04L 5/0098; H04L 5/0055; H04L 5/0053; H04L 5/001; H04L 5/0064
See application file for complete search history.

(56) References Cited

U.S. PATENT DOCUMENTS

2018/0249496 A1    8/2018  Radulescu
2019/0149380 A1*   5/2019  Babaei ............. H04W 72/044
                                                     370/330
2019/0246442 A1*   8/2019  Park ................. H04L 5/0055

OTHER PUBLICATIONS

3GPP TSG RAN WG1 Meeting #92, R1-1802216, Athens, Greece, Feb. 26-Mar. 2, 2018, Agenda Item: 7.1.3.4.1, source: LG electronics, title: remaining issues on bandwidth part operation.
(Continued)

*Primary Examiner* — Dady Chery
(74) *Attorney, Agent, or Firm* — Blue Capital Law Firm, P.C.

(57) ABSTRACT

A method and apparatus are disclosed from the perspective of a UE (User Equipment). In one embodiment, the method includes the UE being configured with a first cell. The method further includes the UE being configured with a second cell. The method includes the UE changing active downlink BWP (Bandwidth Part) of the first cell from a first downlink BWP to a second downlink BWP, wherein a first occasion in the first cell is prior to finishing the change of active downlink BWP of the first cell, and a second occasion in the second cell is prior to finishing the change of active downlink BWP of the first cell. In addition, the method includes the UE transmitting an uplink signal in a slot on the first cell after the change of active downlink BWP, wherein the uplink signal comprises HARQ-ACK (Hybrid Automatic Repeat Request Acknowledgment) associated with the second occasion and not associated with the first occasion.

20 Claims, 16 Drawing Sheets

(52) U.S. Cl.
CPC ........ *H04W 72/1289* (2013.01); *H04W 92/10* (2013.01)

(56) References Cited

OTHER PUBLICATIONS

3GPP TSG RAN WG1 Meeting #92, R1-1801348, Athens, Greece, Feb. 26-Mar. 2, 2018, Agenda Item: 7.1.3.4.2, source: Huawei, HiSilicon, title: summary of remaining issues on NR CA.
3GPP TSG RAN WG1 Meeting #92, R1-1801989, Athens, Greece, Feb. 26-Mar. 2, 2018, Agenda Item: 7.1.3.4.2, source: Samsung, title: correction on CA cooperation.
European Search Report in corresponding EP Application No. 19164706.4, dated Jul. 17, 2019.

\* cited by examiner

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

FIG. 5 (PRIOR ART)

| Value of BWP indicator field | | Bandwidth part |
|---|---|---|
| 1 bit | 2 bits | |
| 0 | 00 | First bandwidth part configured by higher layers |
| 1 | 01 | Second bandwidth part configured by higher layers |
| | 10 | Third bandwidth part configured by higher layers |
| | 11 | Fourth bandwidth part configured by higher layers |

FIG. 6 (PRIOR ART)

METHOD AND APPARATUS FOR DETERMINING CODEBOOK SIZE IN A WIRELESS COMMUNICATION SYSTEM

CROSS-REFERENCE TO RELATED APPLICATIONS

The present application claims the benefit of U.S. Provisional Patent Application Ser. No. 62/649,399 filed on Mar. 28, 2018, the entire disclosure of which is incorporated herein in its entirety by reference.

FIELD

This disclosure generally relates to wireless communication networks, and more particularly, to a method and apparatus for determining codebook size in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE being configured with a first cell. The method further includes the UE being configured with a second cell. The method includes the UE changing active downlink BWP (Bandwidth Part) of the first cell from a first downlink BWP to a second downlink BWP, wherein a first occasion in the first cell is prior to finishing the change of active downlink BWP of the first cell, and a second occasion in the second cell is prior to finishing the change of active downlink BWP of the first cell. In addition, the method includes the UE transmitting an uplink signal in a slot on the first cell after the change of active downlink BWP, wherein the uplink signal comprises HARQ-ACK (Hybrid Automatic Repeat Request Acknowledgment) associated with the second occasion and not associated with the first occasion.

BRIEF DESCRIPTION OF THE DRAWINGS

FIG. 5 is a reproduction of Table 7.3.1-1 of 3GPP R1-1803553.

FIG. 6 is a reproduction of Table 7.3.1.1.2-1 of 3GPP R1-1803553.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: Final Chairman's Note of 3GPP TSG RAN WG1 Meeting #90bis (Prague, CZ, 9-13 Oct. 2017) (updated with email approvals); Final Chairman's Note of 3GPP TSG RAN WG1 Meeting #91 (Reno, USA, 27 Nov.-1 Dec. 2017); Final Chairman's Note of 3GPP TSG RAN WG1 Meeting AH1801 (Vancouver. Canada, 22-26 Jan. 2018); Final Chairman's Note of 3GPP TSG RAN WG1 Meeting #92 (Athens, Greece, Feb. 26-Mar. 2, 2018); R1-1803554. "CR to 38.213 capturing the NR ad-hoc 1801 and RAN1#92 meeting agreements"; and R1-1803553. "CR to 38.212 capturing the January18 ad-hoc and RAN1#92 meeting agreements". The standards and documents listed above are hereby expressly incorporated by reference in their entirety.

Figure 1:
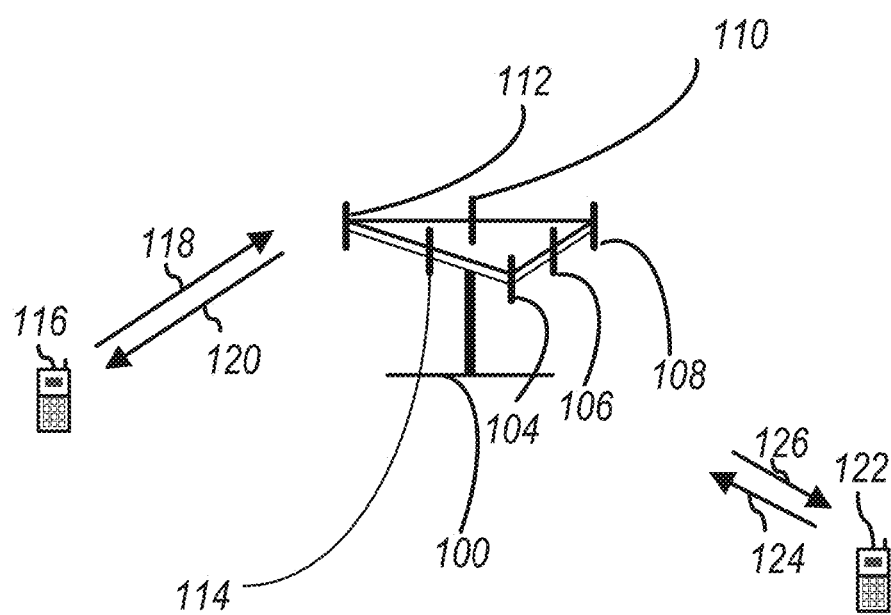
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
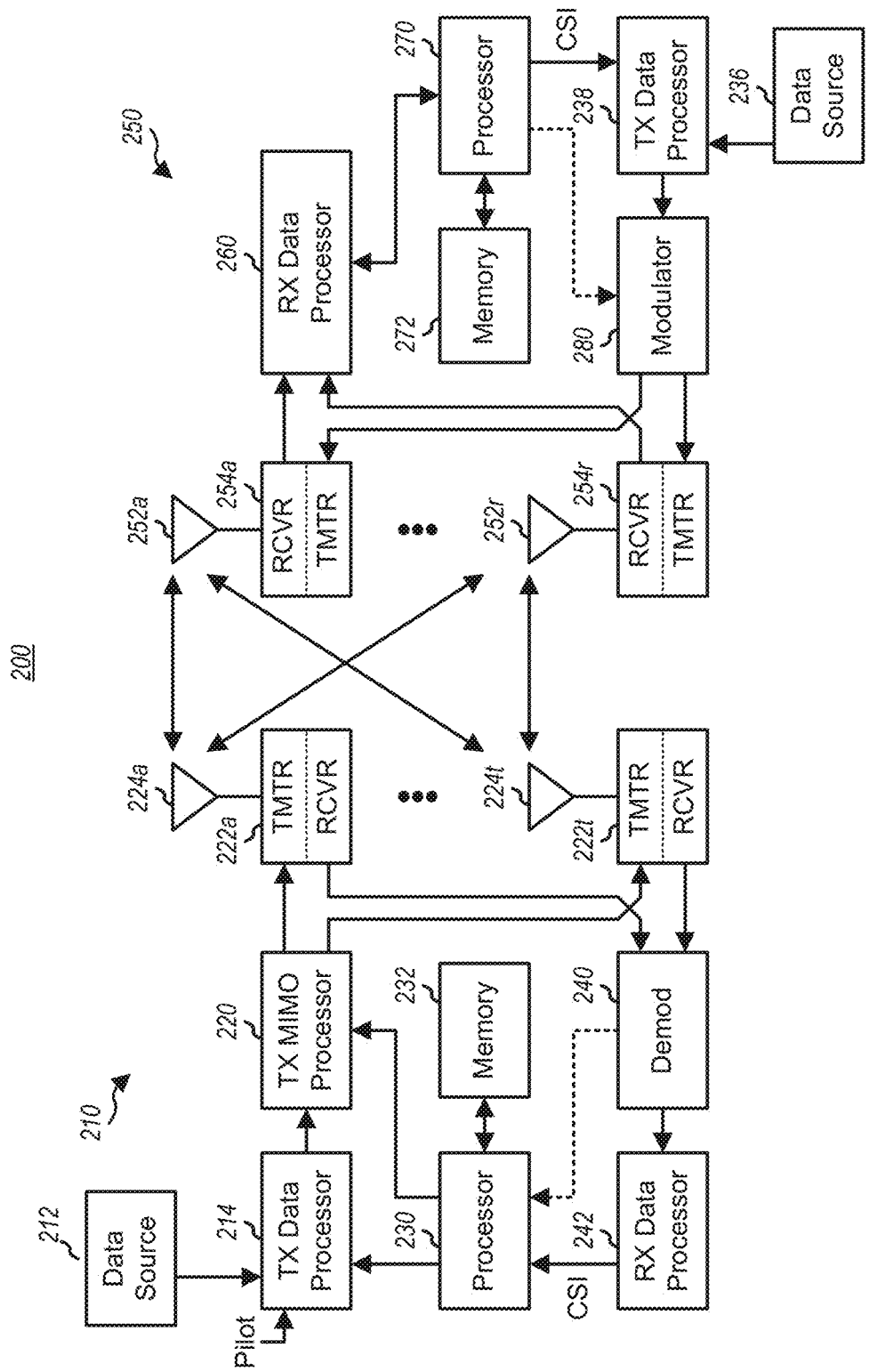
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments. TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
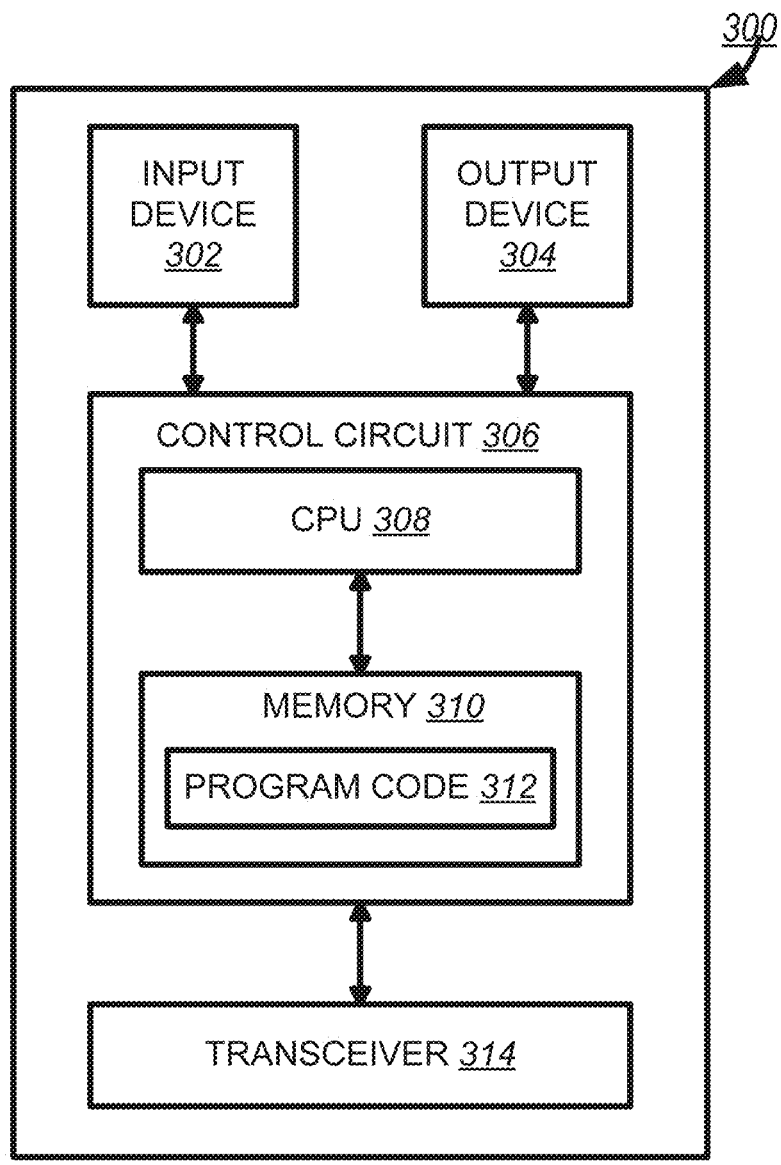
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
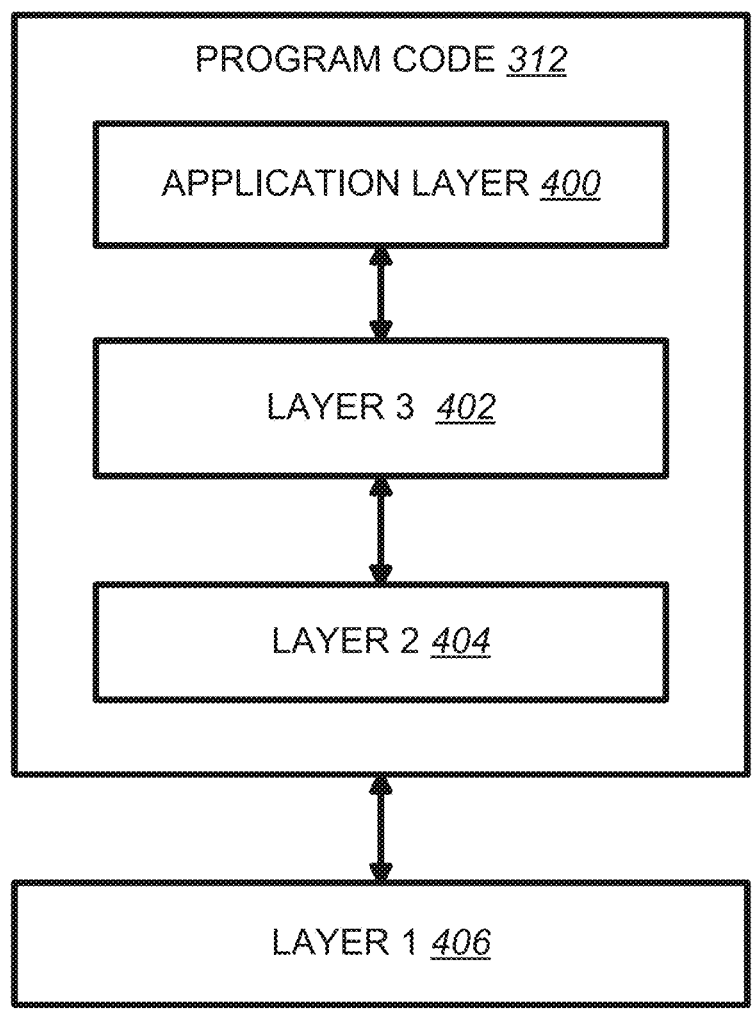
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In the RAN1 #90bis meeting, some agreements related to HARQ-ACK transmission are described in the Final Chairman's Note of 3GPP TSG RAN WG1 Meeting #90bis (Prague. CZ, 9-13 Oct. 2017) (updated with email approvals) as provided below. In addition, semi-static codebook and dynamic codebook for HARQ-ACK (Hybrid Automatic Repeat Request Acknowledgement) transmission are introduced. Regarding to semi-static codebook, semi-static codebook may be determined based on at least number of configured DL (Downlink) serving cells, maximum number of transport block (TB) per DL serving cell, code block group (CBG) number per TB.

Agreements:
1. The timing between DL data transmission and acknowledgement is determined based on 0 or [2] bits in DCI
   a. For both slot and non-slot scheduling, the timing provides the indication to determine the slot and the symbol(s) for the HARQ-ACK transmission
   b. In case of [2]-bits, FFS the actual set of values for slot-based scheduling and non-slot based scheduling, respectively
   c. In case of 0-bit, FFS how to determine the single timing (e.g., UE capability dependent, whether or not to have RRC configuration, the interactions with different cases (e.g., initial access), etc.)
   d. FFS whether or not to have separate information fields or a same information field for HARQ-ACK resource determination and HARQ-timing determination Conclusion:
2. Discuss further offline how to determine HARQ-ACK payload size when two or more PDSCH transmissions are associated with a single UL transmission using PUCCH or PUSCH (e.g., semi-static determination, dynamic determination based on DAI mechanism similar to LTE, etc.)

Agreements:
3. NR supports HARQ-ACK bundling in spatial domain for a NR-PDSCH transmission
   a. FFS details (e.g., whether or not to have RRC configuration, whether to apply to CBG-based HARQ-ACK or not, etc.)

Agreements:
For NR non-CA, both semi-static and dynamic HARQ-ACK codebook are supported by configuration
   Note: the "by-configuration" is also applicable to the CA case Agreements:
Dynamic HARQ-ACK codebook (per PUCCH group) for the case without CBG configuration
   HARQ-ACK codebook determination based on counter DAI and total DAI
      Use LTE as starting point
      FFS details Agreements:
For HARQ-ACK spatial bundling:
   Support higher layer configuration for spatial-domain bundling per PUCCH group
      Bundling is per cell, and same configuration applies to all the cells
      FFS whether or not to support HARQ spatial bundling in a dynamic manner Agreements:
'Semi-static' HARQ-ACK codebook (per PUCCH group) is at least determined by
   Configured number of DL Cells
   The max number of TBs based on configuration for each DL cell
   Configured number of CBGs per TB per configured DL cell
   FFS: Handling of different numerology between UL and DL
   Details FFS
Dynamic HARQ-ACK codebook (per PUCCH group) with CBG configuration at least for one serving cell
   Details FFS In the RAN1 #91 meeting, one agreement regarding to semi-static codebook is described in the Final Chairman's Note of 3GPP TSG RAN WG1 Meeting #91 (Reno. USA, 27 Nov.-1 Dec. 2017) as provided below. The DL association set is determined based on the configured set of HARQ-ACK timings and the DL association set may collect slot and/or mini-slot based on the configured HARQ-ACK timings.

Agreements:
3-bit are used to indicate K1 slot-timing in DCI
   RRC configures the set of values to be indexed by these bits to determine K1
   These values are not slot index dependent
   Each value is represented by 4-bit (i.e., up to 16 different values)

Agreements:
1. For semi-static HARQ-ACK codebook, support
   1. DL association set is determined based on the configured set of HARQ-ACK timings, where the HARQ-ACK payload is ordered based on DL time index
      1. There is no DAI in DL grants Agreements:
1. Generate 2 HARQ-ACK sub-codebooks (sub-CBs)
   1. First sub-CB is for transmissions with TB-based HARQ-ACK, second sub-CB is for transmissions with CBG-based HARQ-ACK
   2. The sub-CBs are combined in a single HARQ-ACK codebook (sub-CB for TB-based HARQ-ACK is placed first)
   3. No additional reliability enhancements Conclusion:
1. It is understood that different PDCCH monitoring periodicities per PUCCH cell group are supported for same scheduling "type" (i.e. 'slot-based scheduling' or "non-slot-based" scheduling)

In the RAN1 adhoc #1801 meeting, some agreements related to HARQ-ACK timings are described in the Final Chairman's Note of 3GPP TSG RAN WG1 Meeting #91 (Vancouver, Canada, 22-26 Jan. 2018) as provided below. Before a UE receives a dedicated configuration regarding to the HARQ-ACK timings (K1), the UE may use values 1 to 8 as HARQ-ACK timings. If the UE receives a dedicated configuration regarding to the HARQ-ACK timings (K1), the UE may transmit HARQ-ACK based on the configured HARQ-ACK timings. In other words, the DL association set may be determined based on the configured HARQ-ACK timings (K1). For example, if a UE is configured with a set of HARQ-ACK timing(s) (or a set of K1 values), the UE transmits HARQ-ACK(s) (and/or a semi-static codebook)

via PUCCH (Physical Uplink Control Channel) in slot #n, wherein the HARQ-ACK(s) corresponds to DL transmission (and/or (unicast) PDSCH (Physical Downlink Shared Channel)) received by the UE in DL slot #n−K1.

Agreements:
1. For PDSCH transmission before RRC connection, the set of timing values K1 between PDSCH and HARQ-ACK is
   1. Defined in specification to use values {1,2,3,4,5,6,7,8}
   2. Note: the values should take into account the UE minimum timing requirements agreed in initial access
2. For PDSCH scheduled by fallback DCI, the set of timing values K1 between PDSCH and HARQ-ACK is
   1. Defined in specification to use values {1,2,3,4,5,6,7,8}

Agreements:
1. The set of K1 slot-timing values which are configurable in RRC at least includes the set
   1. {0,1,2,3,4,5,6,7,8}
   2. Some of the 16 available RRC values may be reserved Agreements:
2. Upon detection of a DL SPS PDSCH in slot n, UE transmits HARQ-ACK in slot n+k when there is no contradicting semi-static configuration, where k is given by the PDSCH-to-HARQ-timing-indicator field carried in the activation DCI for the DL SPS process.
   1. FFS: how to handle the case when the semi-static configuration conflicts at slot n+k
   2. FFS: how to handle the case with dynamic SFI
   3. The contradicting semi-static configuration is defined as when there is at least one semi-statically configured DL symbol overlaps with the symbol(s) carrying HARQ-ACK in slot n+k Agreements:
3. The number of HARQ processes configurable in RRC for unicast PDSCH per cell for a UE includes the set of integers {2,4, 6, 8,10,12,16}
   1. 4-bits are provided in fallback and non-fallback DCI for addressing the HARQ process regardless of configuration
   2. UE does not expect DCI to address process ID larger than number of HARQ processes configured in RRC
   3. Further discussion offline on the number of HARQ processes assumed by the UE before RRC configuration
4. FFS the number of HARQ processes for PUSCH is fixed at 16

R1-1801124 Summary of DL/UL scheduling and HARQ management Qualcomm Inc.

Agreements:
Clarification that Table 2-1 in R1-1801124 for "slot-based scheduling" in previous UE processing time RAN1 #91 corresponds to the following conditions
   Case 1-1: PDCCH monitoring periodicity of 14 or more symbols
      PDCCH monitoring on up to three OFDM symbols at the beginning of a slot
      PDSCH Type A, and PUSCH Type A or B
      PDSCH duration of at least 7 symbols
      For C-RNTI only
      (working assumption) also applicable to the cases when C-RNTI and with other broadcast RNTIs are processed simultaneously by the UE In the RAN1 #92 meeting, one agreement is reached for the HARQ-ACK timings as described in the Final Chairman's Note of 3GPP TSG RAN WG1 Meeting #92 (Athens, Greece, Feb. 26-Mar. 2, 2018) as provided below. HARQ-timing indicated by DCI (Downlink Control Information) format 1_0 and DCI format 1_1 may be different. An agreement is reached to restrict that HARQ-timings indicated by DCI format 1_0 is a subset of HARQ-ACK timings for a given cell.

Agreements:
1. When a UE is configured with semi-static HARQ-ACK Codebook, the codebook is not a function of dynamic SFI Agreements:
2. When a UE is configured with semi-static HARQ-ACK Codebook, support restricting HARQ-ACK timings for DCI format 1_0 to be a subset of ones configured for DCI format 1_1 for a given cell
   1. As an example: Configured HARQ-ACK timing for DCI format 1_1 are {2, 6, 9}→ then, timings for DCI format 1_0 of {2, 6} are possible, but not if any timing value from {1, 3, 4, 5, 7, 8}
      1. UE is not expected to be indicated by DCI format 1_0 a HARQ-ACK timing which is not based on the above rule Conclusion:
1. It is understood that before dedicated RRC configuration, since it was agreed previously "HARQ-ACK is only one bit without bundling before RRC connection", consequently, there is no need to define the default HARQ-ACK codebook before dedicated RRC configuration Agreements:
1. Confirm the following working assumption with updates:
   1. Working assumption: In case a UE is configured for semi-static HARQ-ACK codebook determination, when the UE detects to receive only one PDSCH within a DL association set for HARQ-ACK feedback on the Pcell, the UE reports HARQ-ACK only for the one PDSCH
      1. Additional constraint-only if UE detects DCI format 1_0 with counter DAI value of 1

Agreements:
2. When a UE is configured with Semi-static HARQ-ACK Codebook, HARQ-ACK corresponding to PDSCH transmission(s) of the DL BWP before DL and/or UL BWP switching is not transmitted by the UE after the switching Working Assumption:
1. When a UE is configured with semi-static HARQ-ACK Codebook, on a per cell basis:
   1. If the UE indicates capability to receive more than one unicast PDSCH per slot, it assumes a max number of non-overlapping candidate unicast PDSCH occasions per slot as determined by the SLIV in the configured pdsch-symbolAllocation table.
   2. Otherwise, the UE is expected to receive only one unicast PDSCH per slot, and HARQ-ACK association set assumes one unicast PDSCH per slot;
   3. Handling HARQ-ACK for PDCCH for SPS release follows the same way as in LTE Agreements:
1. In Rel-15, UE is not expected to be configured to report HARQ-ACK on the same PUCCH for more than 2 SPS PDSCH receptions
   1. To include this agreements in one of the LSs to RAN2

Agreements:
2. To respond the LS from RAN2 (on EN-DC):
1. Simultaneous configuration of EN-DC and NR PUCCH Scell (PScell)
   1. Yes, but the UE is not expected to be configured with more than one PUCCH in NR under EN-DC
   2. Also state that it's the RAN1 understanding of the intention of the question from RAN2

2. Simultaneous transmission of PUCCH and PUSCH in LTE for EN-DC
 1. Yes
Procedures related to receive CORESET (Control Resource Set) and/or slot format related information are described in 3GPP R1-1803554 as provided below. BWP (Bandwith Part) related procedure is also described in 3GPP R1-1803554 as provided below.
UE Procedure for Reporting Control Information
If a UE is configured with a SCG, the UE shall apply the procedures described in this subclause for both MCG and SCG.
  When the procedures are applied for MCG, the terms 'secondary cell', 'secondary cells', 'serving cell', 'serving cells' in this clause refer to secondary cell, secondary cells, serving cell, serving cells belonging to the MCG respectively.
  When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.
If the UE is configured with a PUCCH-SCell, the UE shall apply the procedures described in this clause for both primary PUCCH group and secondary PUCCH group
  When the procedures are applied for the primary PUCCH group, the terms 'secondary cell', 'secondary cells', 'serving cell', 'serving cells' in this clause refer to secondary cell, secondary cells, serving cell, serving cells belonging to the primary PUCCH group respectively.
  When the procedures are applied for secondary PUCCH group, the terms 'secondary cell', 'secondary cells', 'serving cell', 'serving cells' in this clause refer to secondary cell, secondary cells (not including the PUCCH-SCell), serving cell, serving cells belonging to the secondary PUCCH group respectively. The term 'primary cell' in this clause refers to the PUCCH-SCell of the secondary PUCCH group.
If a UE would multiplex UCI in a PUCCH transmission that has a same first symbol with a PUSCH transmission, the UE multiplexes the UCI in the PUSCH transmission and does not transmit the PUCCH.
If a UE multiplexes aperiodic CSI in a PUSCH and the UE would multiplex UCI in a PUCCH with a same first symbol as the PUSCH, the UE multiplexes the UCI in the PUSCH.
If a UE transmits multiple PUSCHs that start at a same symbol on respective serving cells and the UE would multiplex UCI in one of the multiple PUSCHs and the UE does not multiplex aperiodic CSI in any of the multiple PUSCHs, the UE multiplexes the UCI in the PUSCH of the serving cell with the smallest ServCellIndex.
A HARQ-ACK information bit value of 0 represents a negative acknowledgement (NACK) while a HARQ-ACK information bit value of 1 represents a positive acknowledgement (ACK).
9.1 HARQ-ACK Codebook Determination
If a UE receives a PDSCH without receiving a corresponding PDCCH, or if the UE receives a PDCCH indicating a SPS PDSCH release, the UE generates one corresponding HARQ-ACK information bit.
If a UE is not configured with higher layer parameter CBG-DL=ON, the UE generates one HARQ-ACK information bit per transport block.

A UE is not expected to be indicated to transmit HARQ-ACK information for more than two SPS PDSCH receptions in a same PUCCH.
In the following, the CRC for DCI format 1_0 is scrambled with a C-RNTI or a CS-RNTI and the CRC for DCI format 1_1 is scrambled with a C-RNTI.
9.1.1 CBG-Based HARQ-ACK Codebook Determination
If a UE is configured per serving cell with higher layer parameter CBG-DL=ON, the UE receives PDSCHs that include code block groups (CBGs) of a transport block. If the UE is configured by higher layer parameter CBG-DL=ON, the UE is configured by higher layer parameter CBGs-per-TB-DL per serving cell a maximum number $N_{HARQ-ACK}^{CBG/TB, max}$ of CBGs for generating respective HARQ-ACK information bits for a transport block reception.
For a number of c code blocks (CBs) in a transport block, the UE determines a number of CBGs as $N_{HARQ-ACK}^{CBG/TB}=\min(N_{HARQ-ACK}^{CBG/TB, max}, C)$. Each of the first $N_{HARQ-ACK}^{CBG/TB,1}=(C, N_{HARQ-ACK}^{CBG/TB})$ CBGs includes $\lceil C/N_{HARQ-ACK}^{CBG/TB} \rceil$ CBs, where CBG $n_{CBG}$, $0 \leq n_{CBG} < N_{HARQ-ACK}^{CBG/TB,1}$, includes CBs $n_{CBG} \cdot \lceil C/N_{HARQ-ACK}^{CBG/TB} \rceil + n_{CB}$, $0 \leq n_{CB} < \lceil C/N_{HARQ-ACK}^{CBG/TB} \rceil$, and each of the last $N_{HARQ-ACK}^{CBG/TB,2}=N_{HARQ-ACK}^{CBG/TB} - \mod(C, N_{HARQ-ACK}^{CBG/TB})$ CBGs includes $\lfloor C/N_{HARQ-ACK}^{CBG/TB} \rfloor$ CBs, where CBG $n_{CBG}$, $N_{HARQ-ACK}^{CBG/TB,1} \leq n_{CBG} < N_{HARQ-ACK}^{CBG/TB,1} + N_{HARQ-ACK}^{CBG/TB,2}$, includes CBs $N_{HARQ-ACK}^{CBG/TB,1} \cdot \lceil C/N_{HARQ-ACK}^{CBG/TB} \rceil + (n_{CBG} - N_{HARQ-ACK}^{CBG/TB,1}) \cdot \lfloor C/N_{HARQ-ACK}^{CBG/TB} \rfloor + n_{CB}$, $0 \leq n_{CB} < \lfloor C/N_{HARQ-ACK}^{CBG/TB} \rfloor$. The UE generates $N_{HARQ-ACK}^{CBG/TB,1} + N_{HARQ-ACK}^{CBG/TB,2}$ HARQ-ACK information bits through a one-to-one mapping with the $N_{HARQ-ACK}^{CBG/TB,1} + N_{HARQ-ACK}^{CBG/TB,2}$ CBGs. If the UE receives two transport blocks, the UE concatenates the HARQ-ACK information bits for the second transport block after the HARQ-ACK information bits for the first transport block. The UE generates an ACK for the HARQ-ACK information bit of a CBG if the UE correctly received all code blocks of the CBG and generates a NACK for the HARQ-ACK information bit of a CBG if the UE incorrectly received at least one code block of the CBG.
A retransmission of a transport block to a UE, corresponding to a same HARQ process as a previous transmission of the transport block to the UE, includes the same CBs in a CBG as the initial transmission of the transport block.
If DCI format 1_1 schedules the retransmission of the transport block and includes a CBG transmission information (CBGTI) field of $N_{TB,c}^{DL} \cdot N_{HARQ-ACK}^{CBG/TB, max}$ bits, where $N_{TB,c}^{DL}$ is the value of higher layer parameter Number-MCS-HARQ-DL-DCI for serving cell c, the first $N_{HARQ-ACK}^{CBG/TB}$ bits of the CBGTI field for the transport block have a one-to-one mapping with the $N_{HARQ-ACK}^{CBG/TB}$ CBGs of the transport block. The UE determines whether or not a CBG is retransmitted based on a corresponding value of the CBGTI field where a binary 0 indicates that a corresponding CBG is retransmitted and a binary 1 indicates that a corresponding CBG is not retransmitted. If a UE is configured with higher layer parameter HARQ-ACK-codebook=semi-static, the HARQ-ACK codebook includes the $N_{HARQ-ACK}^{CBG/TB, max}$ HARQ-ACK information bits and, if $N_{HARQ-ACK}^{CBG/TB} < N_{HARQ-ACK}^{CBG/TB, max}$ for a transport block, the UE generates a NACK value for the last $N_{HARQ-ACK}^{CBG/TB, max} - N_{HARQ-ACK}^{CBG/TB}$ HARQ-ACK information bits for the transport block in the HARQ-ACK codebook.
If the UE generates a HARQ-ACK codebook in response to a retransmission of a transport block, corresponding to a same HARQ process as a previous transmission of the transport block, the UE generates an ACK for each CBG that the UE correctly decoded in a previous transmission of the transport block.

If a UE correctly detects each of the $N_{HARQ-ACK}^{CBG/TB}$ CBGs and does not correctly detect the transport block for the $N_{HARQ-ACK}^{CBG/TB}$ CBGs, the UE generates a NACK value for each of the $N_{HARQ-ACK}^{CBG/TB}$ CBGs.

If a UE receives a PDSCH that is scheduled by a PDCCH with DCI format 1_0, the UE generates HARQ-ACK information only for the transport block in the PDSCH.

If a UE receives a PDSCH that is scheduled by a PDCCH with DCI format 1_0, and if the UE is configured with higher layer parameter HARQ-ACK-codebook=semi-static, the UE repeats $N_{HARQ-ACK}^{CBG/TB, max}$ times the HARQ-ACK information for the transport block in the PDSCH for generating $N_{HARQ-ACK}^{CBG/TB, max}$ HARQ-ACK information bits as described in Subclause 9.1.2.

9.1.2 Type-1 HARQ-ACK Codebook Determination

This subclause applies if the UE is configured with HARQ-ACK-codebook=semi-static.

If a UE reports HARQ-ACK information in a PUSCH or a PUCCH only for a SPS PDSCH release or only for a PDSCH reception within the $M_{A,c}$ occasions for candidate PDSCH receptions, as determined in Subclause 9.1.2.1, that is scheduled by DCI format 1_0 with a counter downlink assignment indicator (DAI) field value of 1 on the PCell, the UE determines a HARQ-ACK codebook only for the SPS PDSCH release or only the PDSCH reception; otherwise, the following procedures for a HARQ-ACK codebook determination apply.

9.1.2.1 Type-1 HARQ-ACK Codebook in Physical Uplink Control Channel

For a serving cell c and the active DL BWP and the active UL BWP, as described in Subclause 12, the UE determines a set of $M_{A,c}$ occasions for candidate PDSCH receptions for which the UE can transmit corresponding HARQ-ACK information in a PUCCH in slot n. The determination is based:

on a set of slot timing values $K_1$ associated with the active DL BWP

If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0;

If the UE is configured to monitor PDCCH for DCI format 1_1 on serving cell c, $K_1$ is provided by higher layer parameter DL-data-DL-acknowledgement for DCI format 1_1;

If the UE is configured to monitor PDCCH for both DCI format 1_0 and DCI format 1_1 on serving cell c, $K_1$ for DCI format 1_0 is provided by the intersection of (a) the set of slot timing values provided by higher layer parameter DL-data-DL-acknowledgement for DCI format 1_1 and (b) the union of the set of slot timing values {1, 2, 3, 4, 5, 6, 7, 8} and the set of slot timing values provided by higher layer parameter DL-data-DL-acknowledgement for DCI format 1_1.

when provided, on a set of row indexes of a table provided by higher layer parameter pdsch-symbolAllocation associated with the active DL BWP and defining respective sets of slot offsets $K_0$, start and length indicators SLIV, and PDSCH mapping types for PDSCH reception as described in [6, TS 38.214]; and when provided, on higher layer parameter UL-DL-configuration-common, higher layer parameter UL-DL-configuration-common-Set2, and higher layer parameter UL-DL-configuration-dedicated as described in Subclause 11.1; and on a PDCCH monitoring periodicity, a PDCCH monitoring offset, and a PDCCH monitoring pattern within a slot for each search space in the set of search spaces configured to the UE for PDCCH candidates corresponding to DCI format 1_0 or DCI format 1_1 for serving cell c as described in Subclause 10.1.

For the set of slot timing values $K_1$, the UE determines $M_{A,c}$ occasions for candidate PDSCH receptions or SPS PDSCH releases according to the following pseudo-code.

```
Set j = 0 - index of occasion for candidate PDSCH reception or SPS PDSCH release
Set B = Ø
Set M_{A,c} = Ø
Set K_{1,C} to the cardinality of set K_1
Set k = 0 - index of slot timing values in set K_1
while k < K_{1,C}
    Set R to the set of rows provided by pdsch-symbolAllocation
    Set R_C to the cardinality of R ,
    Set r = 0 - index of row provided by pdsch-symbolAllocation
    while r < R_C
        if the UE is provided higher layer parameter UL-DL-configuration-common, or higher layer
        parameter UL-DL-configuration-common-Set2, or higher layer parameter UL-DL-
        configuration-dedicated and at least one OFDM symbol of the PDSCH time resource
        derived by row r in slot n - K_{1,k} is configured as UL or slot n - K_{1,k} - K_0, does not include
        at
            least one configured PDCCH monitoring occasion for PDCCH with DCI format 1_0 or DCI
            format 1_1, where K_{1,k} is the k-th slot timing value in set K_1 and K_0 is derived by row r
            of pdsch-symbolAllocation,
            R = R \ r ;
        end if
        r = r + 1 ;
    end while
    If the does not UE indicate capability to receive more than one unicast PDSCH per slot
    and R ≠ Ø ,
        else
        Set R_C to the cardinality of R
        Set m to the smallest last OFDM symbol index, as determined by the SLIV, among all rows of
R
        while R ≠ Ø
        Set r = 0
```

```
    while r < R_C
        if S ≤ m for start OFDM symbol index S for row r
            b_{r,k} = j ; - index of occasion for candidate PDSCH reception or SPS PDSCH release
            associated with row r
                R = R \ r ;
                B = B∪b_{r,k};
        end if
        r = r + 1 ;
    end while
    M_{A,c} = M_{A,c} ∪ j;
    j = j + 1 ;
    Set m to the smallest last OFDM symbol index among all rows of R ;
  end while
  end if
k = k + 1 ;
end while
```

For rows of pdsch-symbolAllocation associated with a same value of $b_{r,k}$, where $b_{r,k} \in B$, the UE is not expected to receive more than one PDSCH in a same slot.

A UE does not report HARQ-ACK information corresponding to PDSCH receptions or SPS PDSCH releases that occur prior to a change of the active DL BWP of the UE on any serving cell.

A UE does not report HARQ-ACK information corresponding to PDSCH receptions or SPS PDSCH releases if the active UL BWP of the UE on the PCell changes between a time of a corresponding DCI format 1_0 or DCI format 1_1 detection and a time of a PUCCH or PUSCH transmission with the HARQ-ACK information.

If a UE is provided higher layer parameter DL-data-DL-acknowledgement, the UE does not expect to be indicated by DCI format 1_0 a slot timing value for transmission of HARQ-ACK information that does not belong to the intersection of the set of slot timing values {1, 2, 3, 4, 5, 6, 7, 8} and the set of slot timing values provided by higher layer parameter DL-data-DL-acknowledgement for the active DL BWP of a corresponding serving cell.

If an occasion for a candidate PDSCH reception can be in response to a PDCCH with DCI format 1_1 and if higher layer parameter Number-MCS-HARQ-DL-DCI indicates reception of two transport blocks, when the UE receives a PDSCH with one transport block, the HARQ-ACK response is associated with the first transport block and the UE generates a NACK for the second transport block if spatial bundling is not applied (HARQ-ACK-spatial-bundling-PUCCH=FALSE) and generates HARQ-ACK value of ACK for the second transport block if spatial bundling is applied.

A UE shall determine $\tilde{o}_0^{ACK}, \tilde{o}_1^{ACK}, \ldots, \tilde{o}_{O^{ACK}-1}^{ACK}$ HARQ-ACK information bits, for a total number of $O_{ACK}$ HARQ-ACK information bits, of a HARQ-ACK codebook for transmission in a PUCCH according to the following pseudo-code. In the following pseudo-code, if the UE does not receive a transport block or a CBG, due to the UE not detecting a corresponding PDCCH with DCI format 1_0 or DCI format 1_1, the UE generates a NACK value for the transport block or the CBG. The cardinality of the set $M_{A,c}$ defines a total number $M_c$ of occasions for PDSCH reception or SPS PDSCH release for serving cell c.

```
Set c = 0 - serving cell index: lower indices correspond to lower RRC indices of
corresponding cell
Set j = 0 - HARQ-ACK bit index
Set N_cells^DL to the number of serving cells configured by higher layers for the UE
while c < N_cells^DL
  Set m = 0 - index of occasion for candidate PDSCH reception or SPS PDSCH release
         while m < M_c
             if HARQ-ACK-spatial-bundling-PUCCH = FALSE, CBG-DL = OFF and the UE is configured
             by higher layer parameter Number-MCS-HARQ-DL-DCI with reception of two transport
             blocks for the active DL BWP of serving cell c ,
                 õ_j^ACK = HARQ-ACK bit corresponding to a first transport block of this cell;
                 j = j + 1 ;
                 õ_j^ACK = HARQ-ACK bit corresponding to a second transport block of this cell;
                 j = j + 1 ;
             elseif HARQ-ACK-spatial-bundling-PUCCH = TRUE, and the UE is configured by higher
             layer parameter Number-MCS-HARQ-DL-DCI with reception of two transport blocks for
             the active DL BWP of serving cell c ,
                 õ_j^ACK = binary AND operation of the HARQ-ACK bits corresponding to first and
                 second transport blocks of this cell - if the UE receives one transport block, the UE
                 assumes ACK for the second transport block;
                 j = j + 1 ;
             elseif CBG-DL = ON, and N_{HARQ-ACK,c}^{CBG/TB, max} CBGs indicated by higher layer parameter CBGs-per-
             TB-DL for serving cell c ,
                 Set n_CBG = 0 - CBG index
                 while n_CBG < N_{HARQ-ACK,c}^{CBG/TB, max}
                     õ_{j+n_CBG}^ACK = HARQ-ACK bit corresponding to CBG n_CBG of the first transport block;
                     if the UE is configured by higher layer parameter Number-MCS-HARQ-DL-DCI
                     with reception of two transport blocks for the active DL BWP of serving cell c
                         õ_{j+n_CBG + N_{HARQ-ACK,c}^{CBG/TBmax}}^ACK = HARQ-ACK bit corresponding to CBG n_CBG of the second
                         transport block;
                     end if
                     n_CBG = n_CBG + 1 ;
```

-continued

```
        end while
        j = j + N_{TB,c}^{DL} · N_{NARQ-AK,c}^{CBG/TBmax}, where N_{TB,c}^{DL} is the value of higher layer parameter Number-
        MCS-HARQ-DL-DCI for the active DL BWP of serving cell c ;
      else
        õ_j^{ACK} = HARQ-ACK bit of this cell
        j = j + 1 ;
      end if
      m = m + 1 ;
    end while
    c = c + 1 ;
end while
```

If $O_{ACK}+O_{SR}+O_{CSI} \leq 11$, the UE determines a number of HARQ-ACK information bits $n_{HARQ-ACK}$ for obtaining a transmission power for a PUCCH, as described in Subclause 7.2.1, as $$n_{HARQ-ACK} = \sum_{c=0}^{N_{cells}^{DL}} \sum_{m=0}^{M_c-1} N_{m,c}^{received} + \sum_{c=0}^{N_{cells}^{DL}} \sum_{m=0}^{M_c-1} N_{m,c}^{received,CBG}$$

where $N_{m,c}^{received}$ is the number of transport blocks the UE receives in PDSCH reception occasion m for serving cell c if HARQ-ACK-spatial-bundling-PUCCH=FALSE, or the number of PDSCH receptions or SPS PDSCH release in PDSCH reception occasion m for serving cell c if HARQ-ACK-spatial-bundling-PUCCH=TRUE and the UE reports corresponding HARQ-ACK information in the PUCCH.

$N_{m,c}^{received, CBG}$ is the number of CBGs the UE receives in a PDSCH reception occasion m for serving cell c and the UE reports corresponding HARQ-ACK information in the PUCCH.

9.1.2.2 Type-1 HARQ-ACK Codebook in Physical Uplink Shared Channel

If a UE multiplexes HARQ-ACK in a PUSCH transmission that is not scheduled by a DCI format or is scheduled by DCI format 0_0, then if the UE has not received any PDSCH or SPS PDSCH release in any of the $M_c$ occasions for PDSCH reception or SPS PDSCH release on any serving cell c, as described in Subclause 9.1.2.1, the UE does not multiplex HARQ-ACK in the PUSCH transmission;

else the UE generates the HARQ-ACK codebook as described in Subclause 9.1.2.1 except that HARQ-ACK-spatial-bundling-PUCCH is replaced by HARQ-ACK-spatial-bundling-PUSCH.

If a UE multiplexes HARQ-ACK in a PUSCH transmission that is scheduled by DCI format 0_1, the UE generates the HARQ-ACK codebook as described in Subclause 9.1.2.1 when a value of the DAI field in DCI format 0_1 is $V_{T-DAI,m}^{UL}=1$ except that HARQ-ACK-spatial-bundling-PUCCH is replaced by HARQ-ACK-spatial-bundling-PUSCH. The UE does not generate a HARQ-ACK codebook for multiplexing in the PUSCH transmission when $V_{T-DAI,m}^{UL}=0$.

10 UE Procedure for Receiving Control Information

If the UE is configured with a SCG, the UE shall apply the procedures described in this clause for both MCG and SCG When the procedures are applied for MCG, the terms 'secondary cell', 'secondary cells', 'serving cell', 'serving cells' in this clause refer to secondary cell, secondary cells, serving cell, serving cells belonging to the MCG respectively.

When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

A UE shall monitor a set of PDCCH candidates in one or more control resource sets on the active DL BWP on each activated serving cell according to corresponding search spaces where monitoring implies decoding each PDCCH candidate according to the monitored DCI formats.

A UE can be configured by higher layer parameter SSB-periodicityServingCell a periodicity of half frames for reception of SS/PBCH blocks in a serving cell.

For monitoring of a PDCCH candidate

If the UE has received SSB-transmitted-SIB1 and has not received SSB-transmitted for a serving cell and if at least one RE for monitoring a PDCCH candidate for a DCI format with CRC not scrambled by SI-RNTI on the serving cell overlaps with respective at least one RE corresponding to a SS/PBCH block index provided by SSB-transmitted-SIB1, the UE is not required to monitor the PDCCH candidate.

If a UE has received SSB-transmitted for a serving cell and if at least one RE for monitoring a PDCCH candidate for a DCI format with CRC not scrambled by SI-RNTI on the serving cell overlaps with respective at least one RE corresponding to a SS/PBCH block index provided by SSB-transmitted, the UE is not required to monitor the PDCCH candidate.

If the has not received both SSB-transmitted-SIB1 and SSB-transmitted for a serving cell and if the UE monitors the PDCCH candidate for a Type0-PDCCH common search space on the serving cell according to the procedure described in Subclause 13, the UE may assume that no SS/PBCH block is transmitted in REs used for monitoring the PDCCH candidate on the serving cell.

If a carrier aggregation capability for a UE, as included in UE-NR-Capability, is larger than 4, the UE includes in UE-NR-Capability an indication for a maximum number of PDCCH candidates the UE can monitor per slot when the UE is configured for carrier aggregation operation over more than 4 cells. When the UE is configured for carrier aggregation operation over more than 4 cells, the UE is not expected to be configured with a number of PDCCH candidates to monitor per slot that is larger than the maximum number.

[ . . . ]

12 Bandwidth Part Operation

If the UE is configured with a SCG, the UE shall apply the procedures described in this clause for both MCG and SCG When the procedures are applied for MCG, the terms 'secondary cell', 'secondary cells', 'serving cell', 'serving cells' in this clause refer to secondary cell, secondary cells, serving cell, serving cells belonging to the MCG respectively.

When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter DL-BWP and a set of at most four BWPs for transmissions by the UE (UL BWP set) in an UL bandwidth by parameter UL-BWP for the serving cell.

An initial active DL BWP is defined by a location and number of contiguous PRBs, a subcarrier spacing, and a cyclic prefix, for the control resource set for Type0-PDCCH common search space. For operation on the primary cell, a UE is provided by higher layer parameter initial-UL-BWP an initial active UL BWP for a random access procedure. If the UE is configured with a secondary carrier on the primary cell, the UE can be configured with an initial BWP for random access procedure on the secondary carrier.

If a UE has dedicated BWP configuration, the UE can be provided by higher layer parameter Active-BWP-DL-Pcell a first active DL BWP for receptions and by higher layer parameter Active-BWP-UL-Pcell a first active UL BWP for transmissions on the primary cell.

For each DL BWP or UL BWP in a set of DL BWPs or UL BWPs, respectively, the UE is configured the following parameters for the serving cell as defined in [4, TS 38.211] or [6, TS 38.214]:

a subcarrier spacing provided by higher layer parameter DL-BWP-mu or UL-BWP-mu;

a cyclic prefix provided by higher layer parameter DL-BWP-CP or UL-BWP-CP;

a PRB offset with respect to the PRB determined by higher layer parameters offset-pointA-low-scs and ref-scs and a number of contiguous PRBs provided by higher layer parameter DL-BWP-BW or UL-BWP-BW;

an index in the set of DL BWPs or UL BWPs by respective higher layer parameters DL-BWP-index or UL-BWP-index;

DCI format 1_0 or DCI format 1_1 detection to a PDSCH reception timing values by higher layer parameter DL-data-time-domain, PDSCH reception to a HARQ-ACK transmission timing values by higher layer parameter DL-data-DL-acknowledgement, and DCI 0_0 or DCI 0_1 detection to a PUSCH transmission timing values by higher layer parameter UL-data-time-domain;

For unpaired spectrum operation, a DL BWP from the set of configured DL BWPs with index provided by higher layer parameter DL-BWP-index is paired with an UL BWP from the set of configured UL BWPs with index provided by higher layer parameter UL-BWP-index when the DL BWP index and the UL BWP index are equal. For unpaired spectrum operation, a UE is not expected to receive a configuration where the center frequency for a DL BWP is different than the center frequency for an UL BWP when the DL-BWP-index of the DL BWP is equal to the UL-BWP-index of the UL BWP.

For each DL BWP in a set of DL BWPs on the primary cell, a UE can be configured control resource sets for every type of common search space and for UE-specific search space as described in Subclause 10.1. The UE is not expected to be configured without a common search space on the PCell, or on the PSCell, in the active DL BWP.

For each UL BWP in a set of UL BWPs, the UE is configured resource sets for PUCCH transmissions as described in Subclause 9.2.

A UE receives PDCCH and PDSCH in a DL BWP according to a configured subcarrier spacing and CP length for the DL BWP. A UE transmits PUCCH and PUSCH in an UL BWP according to a configured subcarrier spacing and CP length for the UL BWP.

If a bandwidth part indicator field is configured in DCI format 1_1, the bandwidth part indicator field value indicates the active DL BWP, from the configured DL BWP set, for DL receptions. If a bandwidth part indicator field is configured in DCI format 0_1, the bandwidth part indicator field value indicates the active UL BWP, from the configured UL BWP set, for UL transmissions.

If a bandwidth part indicator field is configured in DCI format 0_1 or DCI format 1_1 and indicates an UL BWP or a DL BWP different from the active UL BWP or DL BWP, respectively, the UE shall for each information field in the received DCI format 0_1 or DCI format 1_1 if the size of the information field is smaller than the one required for the DCI format 0_1 or DCI format 1_1 interpretation for the UL BWP or DL BWP that is indicated by the bandwidth part indicator, respectively, the UE shall prepend zeros to the information field until its size is the one required for the interpretation of the information field for the UL BWP or DL BWP prior to interpreting the DCI format 0_1 or DCI format 1_1 information fields, respectively;

if the size of the information field is larger than the one required for the DCI format 0_1 or DCI format 1_1 interpretation for the UL BWP or DL BWP that is indicated by the bandwidth part indicator, respectively, the UE shall use a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively;

set the active UL BWP or DL BWP to the UL BWP or DL BWP indicated by the bandwidth part indicator in the DCI format 0_1 or DCI format 1_1, respectively.

A UE is expected to detect a DCI format 0_1 indicating active UL BWP change, or a DCI format 1_1 indicating active DL BWP change, only if a corresponding PDCCH is received within the first 3 symbols of a slot.

For the primary cell, a UE can be provided by higher layer parameter Default-DL-BWP a default DL BWP among the configured DL BWPs. If a UE is not provided a default DL BWP by higher layer parameter Default-DL-BWP, the default DL BWP is the initial active DL BWP.

If a UE is configured for a secondary cell with higher layer parameter Default-DL-BWP indicating a default DL BWP among the configured DL BWPs and the UE is configured with higher layer parameter BWP-Inactivity-Timer indicating a timer value, the UE procedures on the secondary cell are same as on the primary cell using the timer value for the secondary cell and the default DL BWP for the secondary cell.

If a UE is configured by higher layer parameter BWP-InactivityTimer a timer value for the primary cell [11, TS 38.321] and the timer is running, the UE increments the timer every interval of 1 millisecond for frequency range 1 or every 0.5 milliseconds for frequency range 2 if the UE does not detect a DCI format 1_1 for paired spectrum operation or if the UE does not detect a DCI format 1_1 or DCI format 0_1 for unpaired spectrum operation during the interval.

If a UE is configured by higher layer parameter Active-BWP-DL-SCell a first active DL BWP and by higher layer parameter Active-BWP-UL-SCell a first active UL BWP on a secondary cell or carrier, the UE uses the indicated DL BWP and the indicated UL BWP on the secondary cell as the respective first active DL BWP and first active UL BWP on the secondary cell or carrier.

For paired spectrum operation, a UE is not expected to transmit HARQ-ACK on a PUCCH resource indicated by a DCI format 1_0 or a DCI format 1_1 if the UE changes its active UL BWP on the PCell between a time of a detection of the DCI format 1_0 or the DCI format 1_1 and a time of a corresponding HARQ-ACK transmission on the PUCCH.

A UE is not expected to monitor PDCCH when the UE performs RRM measurements [10, TS 38.133] over a bandwidth that is not within the active DL BWP for the UE.

R1-1803553 describes multiple kinds of DCI formats and corresponding content as follows:

7.3 Downlink Control Information

A DCI transports downlink and uplink scheduling information, requests for aperiodic CQI reports, or uplink power control commands for one cell and one RNTI.

The following coding steps can be identified:
Information element multiplexing
CRC attachment
Channel coding
Rate matching 7.3.1 DCI Formats The DCI formats defined in table 7.3.1-1 are supported. [Table 7.3.1-1 of 3GPP R1-1803553, Entitled "DCI Formats", is Reproduced as FIG. 5]

The fields defined in the DCI formats below are mapped to the information bits $a_0$ to $a_{A-1}$ as follows.

Each field is mapped in the order in which it appears in the description, including the zero-padding bit(s), if any, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

If the number of information bits in a DCI format is less than 12 bits, zeros shall be appended to the DCI format until the payload size equals 12.

7.3.1.1 DCI formats for scheduling of PUSCH 7.3.1.1.1 Format 0_0

DCI format 0_0 is used for the scheduling of PUSCH in one cell.

The following information is transmitted by means of the DCI format 0_0 with CRC scrambled by C-RNTI:
Identifier for DCI formats—1 bit
The value of this bit field is always set to 0, indicating an UL DCI format
Frequency domain resource assignment —$\lceil \log_2(N_{RB}^{UL,BWP}(N_{RB}^{UL,BWP}+1)/2) \rceil$ bits where $N_{RB}^{UL,BWP}$ is the size of the initial bandwidth part in case DCI format 0_0 is monitored in the common search space $N_{RB}^{UL,BWP}$ is the size of the active bandwidth part in case DCI format 0_0 is monitored in the UE specific search space and satisfying
the total number of different DCI sizes monitored per slot is no more than 4, and
the total number of different DCI sizes with C-RNTI monitored per slot is no more than 3

For PUSCH hopping with resource allocation type 1:
$N_{UL\_hop}$ bits are used to indicate the frequency offset according to Subclause 6.3 of [6, TS38.214], where
$N_{UL\_hop}=1$ if the higher layer parameter Frequency-hopping-offsets-set contains two offset values and
$N_{UL\_hop}=2$ if the higher layer parameter Frequency-hopping-offsets-set contains four offset values
$\lceil \log_2(N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS38.214]

For non-PUSCH hopping with resource allocation type 1:
$\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS38.214]

Time domain resource assignment—X bits as defined in Subclause 6.1.2.1 of [6, TS38.214]

Frequency hopping flag—1 bit.

Modulation and coding scheme—5 bits as defined in Subclause 6.1.3 of [6, TS38.214]

New data indicator—1 bit

Redundancy version—2 bits as defined in Table 7.3.1.1.1-2

HARQ process number—4 bits

TPC command for scheduled PUSCH—[2] bits as defined in Subclause x.x of [5, TS38.213]

UL/SUL indicator—1 bit for UEs configured with SUL in the cell as defined in Table 7.3.1.1.1-1 and the number of bits for DCI format 1_0 before padding is larger than the number of bits for DCI format 0_0 before padding; 0 bit otherwise.

If the UL/SUL indicator is present in DCI format 0_0 and the higher layer parameter dynamicPUSCHSUL is set to Disabled, the UE ignores the UL/SUL indicator field in DCI format 0_0, and the corresponding PUSCH scheduled by the DCI format 0_0 is for the carrier indicated by the higher layer parameter pucchCarrierSUL;

If the UL/SUL indicator is not present in DCI format 0_0, the corresponding PUSCH scheduled by the DCI format 0_0 is for the carrier indicated by the higher layer parameter pucchCarrierSUL.

7.3.1.1.2 Format 0_1

DCI format 0_1 is used for the scheduling of PUSCH in one cell.

The following information is transmitted by means of the DCI format 0_1 with CRC scrambled by C-RNTI:
Carrier indicator—0 or 3 bits, as defined in Subclause x.x of [5, TS38.213].

UL/SUL indicator—0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1.

Identifier for DCI formats—1 bit
The value of this bit field is always set to 0, indicating an UL DCI format Bandwidth part indicator—0, 1 or 2 bits as defined in Table 7.3.1.1.2-1. The bitwidth for this field is determined as $\lceil \log_2(n_{BWP}) \rceil$ bits, where
$n_{BWP}=n_{BWP,RRC}+1$ if the higher layer parameter BandwidthPart-Config configures up to 3 bandwidth parts and the initial bandwidth part is not included in higher layer parameter BandwidthPart-Config; otherwise $n_{BWP}=n_{BWP,RRC}$;
$n_{BWP,RRC}$ is the number of configured bandwidth parts according to higher layer parameter BandwidthPart-Config.

Frequency domain resource assignment—number of bits determined by the following, where $N_{RB}^{UL,BWP}$ is the size of the active bandwidth part:
$N_{RBG}$ bits if only resource allocation type 0 is configured, where $N_{RBG}$ is defined in Subclause 6.1.2.2.1 of [6, TS38.214],
$\lceil \log_2(N_{RB}^{UL,BWP}(N_{RB}^{UL,BWP}+1)/2) \rceil$ bits if only resource allocation type 1 is configured, or
max $(\lceil \log_2(N_{RB}^{UL,BWP}(N_{RB}^{UL,BWP}+1)/2) \rceil, N_{RBG})+1$ bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
For resource allocation type 0, the $N_{RBG}$ LSBs provide the resource allocation as defined in Subclause 6.1.2.2.1 of [6, TS38.214].
For resource allocation type 1, the $\lceil \log_2(N_{RB}^{UL,BWP}(N_{RB}^{UL,BWP}+1)/2) \rceil$ LSBs provide the resource allocation as follows:
For PUSCH hopping with resource allocation type 1:
$N_{UL\_hop}$ MSB bits are used to indicate the frequency offset according to Subclause 6.3 of [6, TS38.214], where $N_{UL\_hop}=1$ if the higher layer parameter Frequency-hopping-offsets-set contains two offset values and $N_{UL\_hop}=2$ if the higher layer parameter Frequency-hopping-offsets-set contains four offset values
$\lceil \log_2(N_{RB}^{UL,BWP}(N_{RB}^{UL,BWP}+1)/2) \rceil N_{UL\_hop}$ bits provides the frequency domain resource allocation according to Subclause 6.1.2.2.2 of [6, TS38.214]
For non-PUSCH hopping with resource allocation type 1:
$\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS38.214]

Time domain resource assignment—0, 1, 2, 3, or 4 bits as defined in Subclause 6.1.2.1 of [6, TS38.214]. The bitwidth for this field is determined as $\lceil \log_2(I) \rceil$ bits, where I the number of entries in the higher layer parameter pusch-AllocationList.

VRB-to-PRB mapping—0 or 1 bit
0 bit if only resource allocation type 0 is configured or if PUSCH-tp=Enabled;
1 bit according to Table 7.3.1.1.2-33 otherwise, only applicable to resource allocation type 1, as defined in Subclause 6.3.1.7 of [4, TS38.211].

Frequency hopping flag—0 or 1 bit
0 bit if only resource allocation type 0 is configured;
1 bit otherwise, only applicable to resource allocation type 1, as defined in Subclause 6.3 of [6, TS38.214].

Modulation and coding scheme—5 bits as defined in Subclause x.x of [6, TS38.214]
New data indicator—1 bit
Redundancy version—2 bits as defined in Table 7.3.1.1.1-2
HARQ process number—4 bits
1$^{st}$ downlink assignment index—1 or 2 bits
1 bit for semi-static HARQ-ACK codebook;
2 bits for dynamic HARQ-ACK codebook with single HARQ-ACK codebook.
2$^{nd}$ downlink assignment index—0 or 2 bits
2 bits for dynamic HARQ-ACK codebook with two HARQ-ACK sub-codebooks;
0 bit otherwise.
TPC command for scheduled PUSCH—2 bits as defined in Subclause 7.1.1 of [5, TS38.213]
[Table 7.3.1.1.2-1 of 3GPP R1-1803553, Entitled "Bandwidth Part Indicator", is Reproduced as FIG. 6]

7.3.1.2 DCI Formats for Scheduling of PDSCH
7.3.1.2.1 Format 1_0
DCI format 1_0 is used for the scheduling of PDSCH in one DL cell.
The following information is transmitted by means of the DCI format 1_0 with CRC scrambled by C-RNTI:
Identifier for DCI formats—1 bits
The value of this bit field is always set to 1, indicating a DL DCI format
Frequency domain resource assignment $-\lceil \log_2(N_{RB}^{UL,BWP}(N_{RB}^{UL,BWP}+1)/2) \rceil$ bits
$N_{RB}^{DL,BWP}$ is the size of the initial bandwidth part in case DCI format 1_0 is monitored in the common search space
$N_{RB}^{DL,BWP}$ is the size of the active bandwidth part in case DCI format 1_0 is monitored in the UE specific search space and satisfying
the total number of different DCI sizes monitored per slot is no more than 4, and
the total number of different DCI sizes with C-RNTI monitored per slot is no more than 3
Time domain resource assignment—X bits as defined in Subclause 5.1.2.1 of [6, TS38.214]
VRB-to-PRB mapping—1 bit according to Table 7.3.1.1.2-33
Modulation and coding scheme—5 bits as defined in Subclause 5.1.3 of [6, TS38.214]
New data indicator—1 bit
Redundancy version—2 bits as defined in Table 7.3.1.1.1-2
HARQ process number—4 bits
Downlink assignment index—2 bits as defined in Subclause 9.1.3 of [5, TS38.213], as counter DAI
TPC command for scheduled PUCCH—[2] bits as defined in Subclause 7.2.1 of [5, TS38.213]
PUCCH resource indicator—3 bits as defined in Subclause 9.2.3 of [5, TS38.213]
PDSCH-to-HARQ_feedback timing indicator—[3] bits as defined in Subclause x.x of [5, TS38.213]
The following information is transmitted by means of the DCI format 1_0 with CRC scrambled by P-RNTI:
Short Messages Indicator—1 bit. This bit is used to indicate whether the short message only or scheduling information only is carried in the Paging DCI.
The following information is transmitted by means of the DCI format 1_0 with CRC scrambled by SI-RNTI:
XXX—x bit
The following information is transmitted by means of the DCI format 1_0 with CRC scrambled by RA-RNTI:
Identifier for DCI formats-1 bit, reserved Frequency domain resource assignment —$\lceil \log_2(N_{RB}^{UL,BWP}(N_{RB}^{UL,BWP}+1)/2)\rceil$ bits $N_{RB}^{DL,BWP}$ is the size of the initial bandwidth part in case DCI format 1_0 is monitored in the common search space in CORESET 0

$N_{RB}^{DL,BWP}$ is the size of the active bandwidth part in case DCI format 1_0 is monitored in the UE specific search space and satisfying the total number of different DCI sizes monitored per slot is no more than 4, and the total number of different DCI sizes with C-RNTI monitored per slot is no more than 3

Time domain resource assignment—X bits as defined in Subclause 5.1.2.1 of [6, TS38.214]

VRB-to-PRB mapping—1 bit

Modulation and coding scheme—5 bits as defined in Subclause 5.1.3 of [6, TS38.214], using Table 5.1.3.1-1

New data indicator—1 bit, reserved

Redundancy version—2 bits, reserved

HARQ process number—4 bits, reserved

Downlink assignment index—2 bits, reserved

TPC command for scheduled PUCCH—2 bits, reserved

PUCCH resource indicator—3 bits, reserved

PDSCH-to-HARQ_feedback timing indicator—3 bits, reserved

The following information is transmitted by means of the DCI format 1_0 with CRC scrambled by TC-RNTI:

Identifier for DCI formats—1 bit

The value of this bit field is always set to 1, indicating a DL DCI format

Frequency domain resource assignment —$\lceil \log_2(N_{RB}^{UL,BWP}(N_{RB}^{UL,BWP}+1)/2)\rceil$ bits $N_{RB}^{DL,BWP}$ is the size of the initial bandwidth part in case DCI format 1_0 is monitored in the common search space in CORESET 0

$N_{RB}^{DL,BWP}$ is the size of the active bandwidth part in case DCI format 0_0 is monitored in the UE specific search space and satisfying the total number of different DCI sizes monitored per slot is no more than 4, and the total number of different DCI sizes with C-RNTI monitored per slot is no more than 3

Time domain resource assignment—X bits as defined in Subclause 5.1.2.1 of [6, TS38.214]

VRB-to-PRB mapping—1 bit

Modulation and coding scheme—5 bits as defined in Subclause 5.1.3 of [6, TS38.214], using Table 5.1.3.1-1

New data indicator—1 bit

Redundancy version—2 bits as defined in Table 7.3.1.1.1-2

HARQ process number—4 bits

Downlink assignment index—2 bits, reserved

TPC command for scheduled PUCCH—2 bits as defined in Subclause 7.2.1 of [5, TS38.213]

PUCCH resource indicator—3 bits as defined in Subclause 9.2.3 of [5, TS38.213]

PDSCH-to-HARQ_feedback timing indicator—3 bits as defined in Subclause x.x of [5, TS38.213]

The following information is transmitted by means of the DCI format 1_0 with CRC scrambled by CS-RNTI:

XXX—x bit 7.3.1.2.2 Format 1_1

DCI format 1_1 is used for the scheduling of PDSCH in one cell.

The following information is transmitted by means of the DCI format 1_1 with CRC scrambled by C-RNTI:

Carrier indicator—0 or 3 bits as defined in Subclause x.x of [5, TS38.213].

Identifier for DCI formats—1 bits

The value of this bit field is always set to 1, indicating a DL DCI format

Bandwidth part indicator—0, 1 or 2 bits as defined in Table 7.3.1.1.2-1. The bitwidth for this field is determined as $\lceil \log_2(n_{BWP}) \rceil$ bits, where $n_{BWP}=n_{BWP,RRC}+1$ if the higher layer parameter BandwidthPart-Config configures up to 3 bandwidth parts and the initial bandwidth part is not included in higher layer parameter BandwidthPart-Config; otherwise $n_{BWP}=n_{BWP,RRC}$;

$n_{BWP,RRC}$ is the number of configured bandwidth parts according to higher layer parameter BandwidthPart-Config.

Frequency domain resource assignment—number of bits determined by the following, where $N_{RB}^{DL,BWP}$ is the size of the active bandwidth part:

$N_{RBG}$ bits if only resource allocation type 0 is configured, where $N_{RBG}$ is defined in Subclause 5.1.2.2.1 of [6, TS38.214], $\lceil \log_2(N_{RB}^{DL,BWP}(N_{RB}^{UL,BWP}+1)/2)\rceil$ bits if only resource allocation type 1 is configured, or $\max(\lceil \log_2(N_{RB}^{DL,BWP}(N_{RB}^{DL,BWP}+1)/2)\rceil, N_{RBG})+1$ bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Subclause 5.1.2.2.1 of [6, TS38.214].

For resource allocation type 1, the $\lceil \log_2(N_{RB}^{DL,BWP}(N_{RB}^{UL,BWP}+1)/2)\rceil$ LSBs provide the resource allocation as defined in Subclause 5.1.2.2.2 of [6, TS38.214]

Time domain resource assignment—0, 1, 2, 3, or 4 bits as defined in Subclause 5.1.2.1 of [6, TS38.214]. The bitwidth for this field is determined as $\lceil \log_2(I) \rceil$ bits, where I is the number of entries in the higher layer parameter pusch-AllocationList.

VRB-to-PRB mapping—0 or 1 bit 0 bit if only resource allocation type 0 is configured;

1 bit according to Table 7.3.1.1.2-33 otherwise, only applicable to resource allocation type 1, as defined in Subclause xxx of [4, TS38.211].

PRB bundling size indicator—0 bit if the higher layer parameter PRB_bundling is not configured or is set to 'static', or 1 bit if the higher layer parameter PRB_bundling is set to 'dynamic', according to Subclause 5.1.2.3 of [6, TS38.214].

Rate matching indicator—0, 1, or 2 bits according to higher layer parameter rate-match-PDSCH-resource-set.

ZP CSI-RS trigger—0, 1, or 2 bits as defined in Subclause x.x of [6, TS38.214]. The bitwidth for this field is determined as $\lceil \log_2(n_{ZP}+1) \rceil$ bits, where $n_{ZP}$ is the number of ZP CSI-RS resource sets in the higher layer parameter [ZP-CSI-RS-ResourceConfigList].

For transport block 1:

Modulation and coding scheme—5 bits as defined in Subclause x.x of [6, TS38.214]

New data indicator—1 bit

Redundancy version—2 bits as defined in Table 7.3.1.1.1-2
For transport block 2 (only present if Number-MCS-HARQ-DL-DCI equals 2):
  Modulation and coding scheme—5 bits as defined in Subclause x.x of [6, TS38.214]
  New data indicator—1 bit
  Redundancy version—2 bits as defined in Table 7.3.1.1.1-2
HARQ process number—4 bits
Downlink assignment index—number of bits as defined in the following
  4 bits if more than one serving cell are configured in the DL and the higher layer parameter HARQ-ACK-codebook=dynamic, where the 2 MSB bits are the counter DAI and the 2 LSB bits are the total DAI;
  2 bits if only one serving cell is configured in the DL and the higher layer parameter HARQ-ACK-codebook=dynamic, where the 2 bits are the counter DAI;
  0 bits otherwise.
TPC command for scheduled PUCCH—2 bits as defined in Subclause x.x of [5, TS38.213]
PUCCH resource indicator—3 bits as defined in Subclause 9.2.3 of [5, TS38.213]
PDSCH-to-HARQ_feedback timing indicator—3 bits as defined in Subclause 9.2.3 of [5, TS38.213]
Antenna port(s)—4, 5, or 6 bits as defined by Tables 7.3.1.2.2-1/2/3/4, where the number of CDM groups without data of values 1, 2, and 3 refers to CDM groups {0}, {0,1}, and {0, 1,2} respectively.
Transmission configuration indication—0 bit if higher layer parameter tci-PresentInDCI is not enabled; otherwise 3 bits as defined in Subclause x.x of [6, TS38.214].
SRS request—2 bits as defined by Table 7.3.1.1.2-24 for UEs not configured with SUL in the cell; 3 bits for UEs configured SUL in the cell where the first bit is the non-SUL/SUL indicator as defined in Table 7.3.1.1.1-1 and the second and third bits are defined by Table 7.3.1.1.2-24.
CBG transmission information (CBGTI)—0, 2, 4, 6, or 8 bits as defined in Subclause x.x of [6, TS38.214], determined by higher layer parameter maxCodeBlockGroupsPerTransportBlock for the PDSCH.
CBG flushing out information (CBGFI)—0 or 1 bit as defined in Subclause x.x of [6, TS38.214], determined by higher layer parameter codeBlockGroupFlushIndicator.
DMRS sequence initialization—1 bit for $n_{SCID}$ selection defined in Subclause 7.4.1.1.1 of [4, TS38.211].

In wireless communication system, number of HARQ-ACK bit feedback needs to be defined carefully. In the current PHY specification (as discussed in 3GPP R1-1803554), regarding to semi-static codebook, a UE may determine a set of occasion(s) which the UE may transmit HARQ-ACK information bit(s) for the occasion(s) in the set. The determination can be based on slot timing value, pdsch-symbolAllocation, semi-static DL/UL assignment, PDCCH-config. When the set is determined, the UE may transmit HARQ-ACK information bit for corresponding occasion in the set. If the UE does not receive a transport block (TB) or a code block group (CBG) due to the UE not detecting a corresponding PDCCH for the TB or the CBG, the UE may generate a NACK value for the TB or the CBG.

Regarding to carrier aggregation (CA) scenario, the UE may determine the set of monitoring occasion for each serving cell. Summation of cardinality of the set for each serving cell can determine size of semi-static codebook. In RAN1 #92 meeting (as discussed the Final Chairman's Note of 3GPP TSG RAN WG1 Meeting #92 (Athens. Greece. Feb. 26-Mar. 2, 2018), some agreements are reached for semi-static codebook determination regarding to bandwidth part (BWP) switching. The UE may not generate/transmit/report HARQ-ACK information bit corresponding to occasion(s) in the set prior to (finishing) BWP switching. But, the semi-static codebook determination is determined based on the cardinality of the set which means that the UE still transmits at least one HARQ-ACK information bit for the occasion(s) prior to (finishing) BWP switch. This may incur unnecessary ambiguity. In addition, regarding to fallback mode of semi-static codebook, the UE can transmit, generate, or report a HARQ-ACK information bit for an occasion which the UE is indicated by a bit in downlink control information that only the occasion needs to feedback HARQ-ACK information bit(s). The fallback mode for feedback HARQ-ACK information bits(s) can save resources without including all occasions in the set. However, considering BWP switch within the set and/or partially overlap the set, the UE may receive multiple downlink control information with the bit indicating fallback mode of semi-static codebook. Hence, how UE treats this case needs to be solved.

A general concept of this invention is that a UE may exclude at least an occasion from a set of occasion(s) when the UE determines a set. In one embodiment, the excluded occasion occurs prior to (finishing) a bandwidth part (BWP) change/switch. The BWP may be a DL BWP and/or a UL BWP. The set may comprise a codebook. The UE could determine HARQ-ACK codebook base on the set. In one embodiment, the UE may transmit HARQ-ACK(s) corresponding to the set of occasion(s) in a PUCCH and/or a PUSCH in a slot after the BWP change/switch. The UE may be configured with semi-static regarding to the codebook.

In one embodiment, an occasion in the set may refer to a candidate PDSCH reception occasion and/or a SPS PDSCH release occasion. The SPS PDSCH release occasion means a reception occasion of a PDCCH indicating SPS PDSCH release and/or SPS PUSCH release.

A UE can be configured with a first set of timings. In one embodiment, the first set of timings can refer to DL-data-DL-acknowledgement. A second set of timings can be a default set. The UE could determine a set of occasion(s) based on at least the first set of timings and/or the second set of timings.

Figure 7:
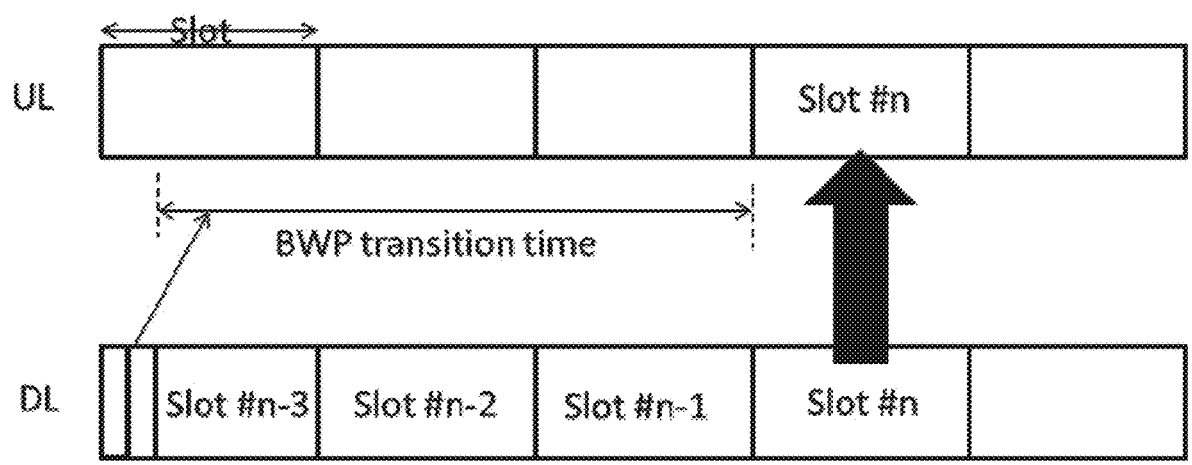
FIG. 7 is a diagram according to one embodiment.

FIG. 7 illustrates an example for determining a set of occasion(s) for transmitting HARQ-ACK feedback in slot #n. For paired spectrum, a UE receives a DCI in a control resource set (CORESET) occupying the first two OFDM symbols in slot #n−3 indicating a change of UL BWP from current active UL BWP to a target active UL BWP and the UE is configured a set of timings as {0, 1, 2, 3}. The UE may exclude occasion(s) in DL slot #n−3, slot #n−2, slot #n−1 from the set when determining the set of occasion(s).

As shown in FIG. 7, if a UE is configured with a first set of timings as {0,1,2,3} and the UE may transmit an uplink signal associated with a set of occasion(s) in slot #n, the set of occasion(s) may comprise occasion(s) in slot #n−0, #n−1. #n−2, #n−3. The UE can be configured with at most four DL and/or UL bandwidth parts (BWP). The UE may change/switch current active BWP to a target BWP when receiving a DCI indicating a BWP index for the target BWP. Additionally and alternatively, the UE may change/switch current active BWP to a default BWP when a timer expires. The UE may determine the set of occasion(s) based on the target BWP. The UE may exclude occasion(s) configured in the target BWP during a time.

In one embodiment, the time can refer to the slot(s) prior to BWP change or switch. The time can also refer to BWP switch transition time and/or RF retuning time. IN one embodiment, the time may start from last OFDM (Orthogonal Frequency Division Multiplexing) symbol carrying a PDCCH indicating BWP switching to a slot where UE can transmit/receive signal(s) on the target/new BWP indicated by the PDCCH. In one embodiment, the time can refer to the slot(s) prior to (finishing) BWP change or switch.

When the UE determines the set of occasion(s) in a slot and the slot is the first slot after the time and/or BWP switching, the UE may exclude occasion(s) before the slot. For example, as shown in FIG. 7, assuming slot #n is the first slot after BWP switching from BWP #1 to BWP #2 and a set of timings is configured as {0,1,2,3}, a UE may exclude occasion(s) in slot #n−1 and slot #n−2 and slot #n−3 when the UE determines a set of occasion(s) for transmitting corresponding HARQ-ACK(s) in slot #n. In another example, if a UE determines a set of occasion(s) in slot #n+1 while slot #n is the first slot after BWP switching from BWP #1 to BWP #2 and a set of timings is configured as {0,1,2,3}, the UE may exclude occasion(s) in slot #n−2 and slot #n−3.

A UE can be configured to transmit and/or receive signal(s) in paired spectrum in a serving cell. The UE can be configured with at most four DL and/or UL bandwidth parts (BWP) in the serving cell. The UE may change/switch current active BWP to a target BWP when receiving a DCI indicating a BWP index for the target BWP. Additionally and alternatively, the UE may switch current active BWP to a default BWP when a timer expires. In one embodiment, the default BWP can refer to an initial BWP. The default BWP can also refer to a BWP configured by a network. In one embodiment, the initial DL BWP may refer to a DL BWP configured by PBCH and/or a DL BWP for UE without a dedicated RRC signaling. The initial UL BWP may refer to a UL BWP configured by system information. More specifically, the initial UL BWP may be indicated by remaining system information (RMSI). Additionally and alternatively, the UE may change or switch current active UL BWP to an initial UL BWP due to no PRACH resource in current active UL BWP when the UE triggers RACH procedure.

The UE can be configured with a first set of timings. In one embodiment, the first set of timings can refer to DL-data-DL-acknowledgement. A second set of timings can be a default set. In one embodiment, the default set could be {1,2, 3, 4, 5, 6, 7, 8}. The UE could determine a set of occasion(s) based on at least the first set of timings and/or the second set of timings. In one embodiment, the occasion(s) in the set may refer to a candidate PDSCH reception and/or SPS release PDSCH. If the UE switches current active UL BWP to a target UL BWP, the UE may exclude occasion(s) in DL slot(s) based on the first set of timings and/or the second set of timings when determining the set of occasion(s), wherein the occasion(s) excluded by the UE occurs in DL slot(s) prior to (finishing) BWP switching.

For example, as shown in FIG. 7, when a UE determines a set of occasion(s) in slot #n, wherein the slot #n is the first slot after the UE changes/switches an old/original active UL BWP to a new/target active UL BWP and a set of timings is configured as {0, 1, 2, 3}, the UE may exclude occasion(s) in slot #n−1, slot #n−2, slot #n−3 from the set. In another example, when a UE determines a set of occasion(s) in slot #n+1 and the slot #n is the first slot after the UE changes or switches an old/original active UL BWP to a new/target active UL BWP and a set of timings is configured as {0, 1, 2, 3}, the UE may exclude occasion(s) in slot #n−2, slot #n−3 from the set.

In one embodiment, in case the UE is configured for semi-static codebook determination, when the UE detects to receive only one PDSCH within the set of occasion(s) on the PCell, the UE reports HARQ-ACK only for the one PDSCH if the UE detects DCI format 1_0 with counter DAI value of 1 which may indicate the UE an fallback transmission.

Figure 8:
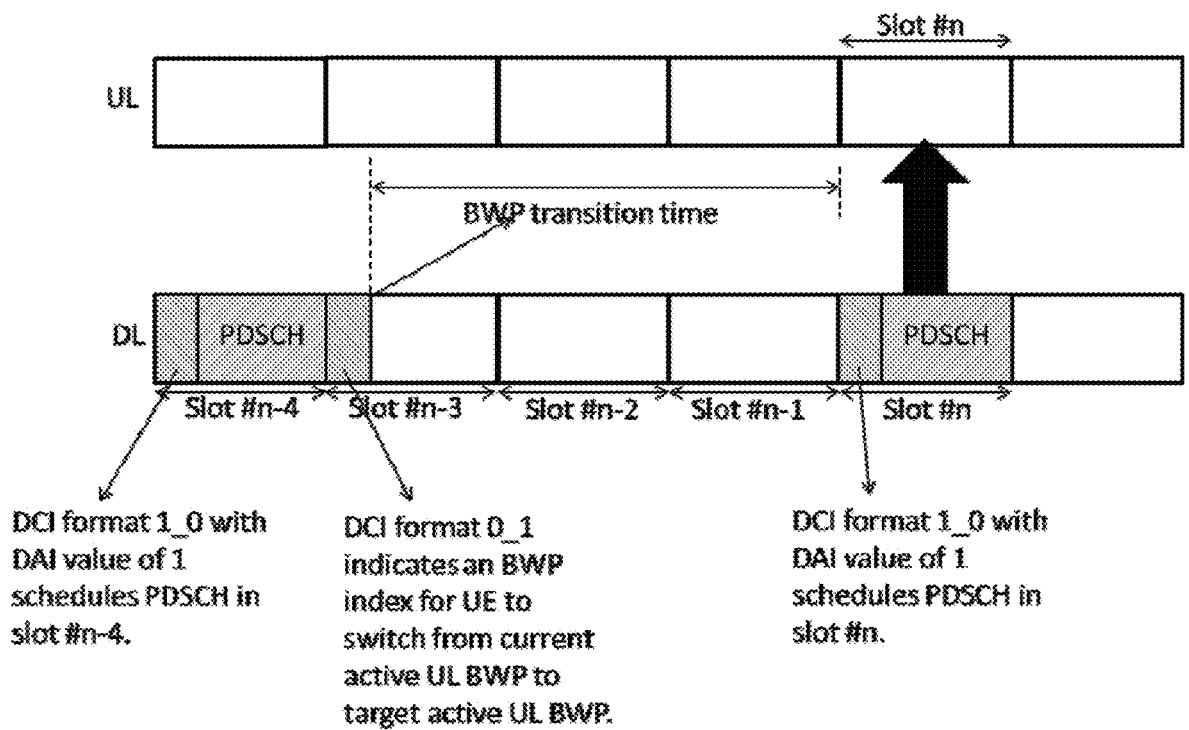
FIG. 8 is a diagram according to one embodiment.

In one embodiment, the UE may receive more than one DCI format 1_0 with DAI value of 1 when the UE changes/switches current active BWP to target active BWP. For example, as shown in FIG. 8, a UE may determine a set of occasion(s) in slot #n based on a set of timings which is assumed as {0, 1, 2, 3, 4}. In this example, if a UE detects a DCI format 1_0 with DAI value of 1 in slot #n−4 and receives a DCI format 0_1 indicating UL BWP switching, the UE determines the set of occasion(s) by excluding the DL slot #n−1, slot #n−2, slot #n−3, slot #n−4.

In the same example, cardinality of the set of occasion(s) may decrease. In this example, the UE can receive a DCI format 1_0 with DAI value of 1 in DL slot #n. The UE can skip or ignore the DCI format 1_0 with DAI value of 1 in slot #n−4. The UE can also skip or ignore a DCI format 1_0 with DAI value of 1 if the DCI is transmitted in an occasion prior to (finishing) BWP switching.

In one embodiment, if the UE changes or switches current active UL BWP to a target UL BWP, the UE may transmit NACK value(s) corresponding to occasion(s) wherein the occasion(s) may occur prior to (switching to) the target UL BWP. In one embodiment, the set of occasion(s) is not a function or is not determined regarding to BWP switching. For example, as shown in FIG. 7, assuming a UE is configured to transmit and/or receive signal(s) in unpaired spectrum and the UE is configured with a set of timings as {0, 1, 2, 3}, the UE may transmit an uplink signal in slot #n with HARQ-ACK(s) corresponding to a set of occasion(s). In this example, if the UE switches current active UL BWP to a target active UL BWP and slot #n is the first slot after the switching, HARQ-ACK for the occasion(s) which occur prior to slot #n may be transmitted/set as NACK by the UE.

In one embodiment, network may ignore or skip HARQ-ACK transmitted by the UE corresponding to the occasion(s) in the set which the occasion(s) occur prior to (finishing) UL active BWP switching. In one embodiment, the uplink signal can be transmitted on PUCCH and/or PUSCH. Additionally, the set of occasion(s) may be determined based on PDCCH monitoring occasion and offset, a bit map indicating PDCCH monitoring occasion within a slot. The set of occasion(s) may also be determined based on pdsch-symbolAllocation associated with the active DL BWP. Furthermore, the set of occasion(s) may be determined based on UL-DL-configuration-common and/or UL-DL-configuration-common-Set2 if configured and/or UL-DL-configuration-dedicated if configured.

In one embodiment, if a first set of timings and/or a second set of timings don't include value 0, the UE transmits PUCCH and/or PUSCH in an UL slot without HARQ-ACK corresponding to the set of occasion(s), wherein the UL slot is the first slot after active DL and/or active UL BWP switching, a UE can skip transmitting uplink signal(s). For example, as shown in FIG. 7, if a set of timings is configured as {1, 2, 3} in slot #n which is the first slot after active UL BWP switching and a UE receives a DCI format 0_1 indicating active UL BWP switching in slot #n−3, the UE may determine a set of occasion(s) in slot #n excluding occasion(s) in DL slot #n−1, DL slot #n−2, DL slot #n−3. In this example, the UE may transmit PUSCH in slot #n without HARQ-ACK(s) corresponding to the set of occasion(s). More specifically, the UE may not perform HARQ-ACK transmission in slot #n since there is no associated occasion(s).

A UE can be configured with at least two serving cell(s) which are a first serving cell and a second serving cell. The UE can be configured with CrossCarrierSchedulingConfig. The UE can be configured to receive downlink control signal(s) in the first serving cell, wherein the downlink control signal(s) can schedule data signal(s) in the first serving cell and the second serving cell.

A UE can be configured with a first set of timings. In one embodiment, the first set of timings can refer to DL-data-DL-acknowledgement. The first set of timings may be the same for the first serving cell and the second serving cell. Alternatively, the first set of timings may be different for the first serving cell and the second serving cell. In one embodiment, a second set of timings can be a default set. Furthermore, the second set of timings may be the same for the first serving cell and the second serving cell. Alternatively, the second set of timings may be different for the first serving cell and the second serving cell. The UE could determine a first set of occasion(s) for the first serving cell and/or a second set of occasion(s) for the second serving cell based on at least the first set of timings and/or the second set of timings. In one embodiment, the UE could determine a first set of occasion(s) for the first serving cell and/or a second set of occasion(s) for the second serving cell based on at least the first set of timings and/or the second set of timings respectively.

In one embodiment, if the UE changes or switches current active BWP of the first serving cell to target active BWP of the first serving cell, the UE may exclude occasion(s) from the second set of occasion(s) when determining the second set of occasion(s), wherein the occasions occur prior to (finishing) BWP switching of the first serving cell. In one embodiment, the UE may exclude occasion(s) from the second set of occasion(s) when determining the second set of occasion(s), wherein the excluded occasions of the second serving cell are overlapped with the time prior to (finishing) BWP switching of the first serving cell. If an occasion in the second serving cell is configured for the UE to receive a data signal which is not scheduled by a (dynamic) downlink control signal, the UE may take into account the occasion in case of BWP switching in the first serving cell when determining the second set of occasion(s) for the second serving cell. In one embodiment, taking into account the occasion could mean that the occasion is determined to be comprised in the second set of occasion(s) when determining the second set of occasion(s). Taking into account the occasion could also mean that the occasion is not excluded from the second set of occasion(s) when determining the second set of occasion(s). In one embodiment, the downlink data can refer to SPS-PDSCH.

Figure 9:
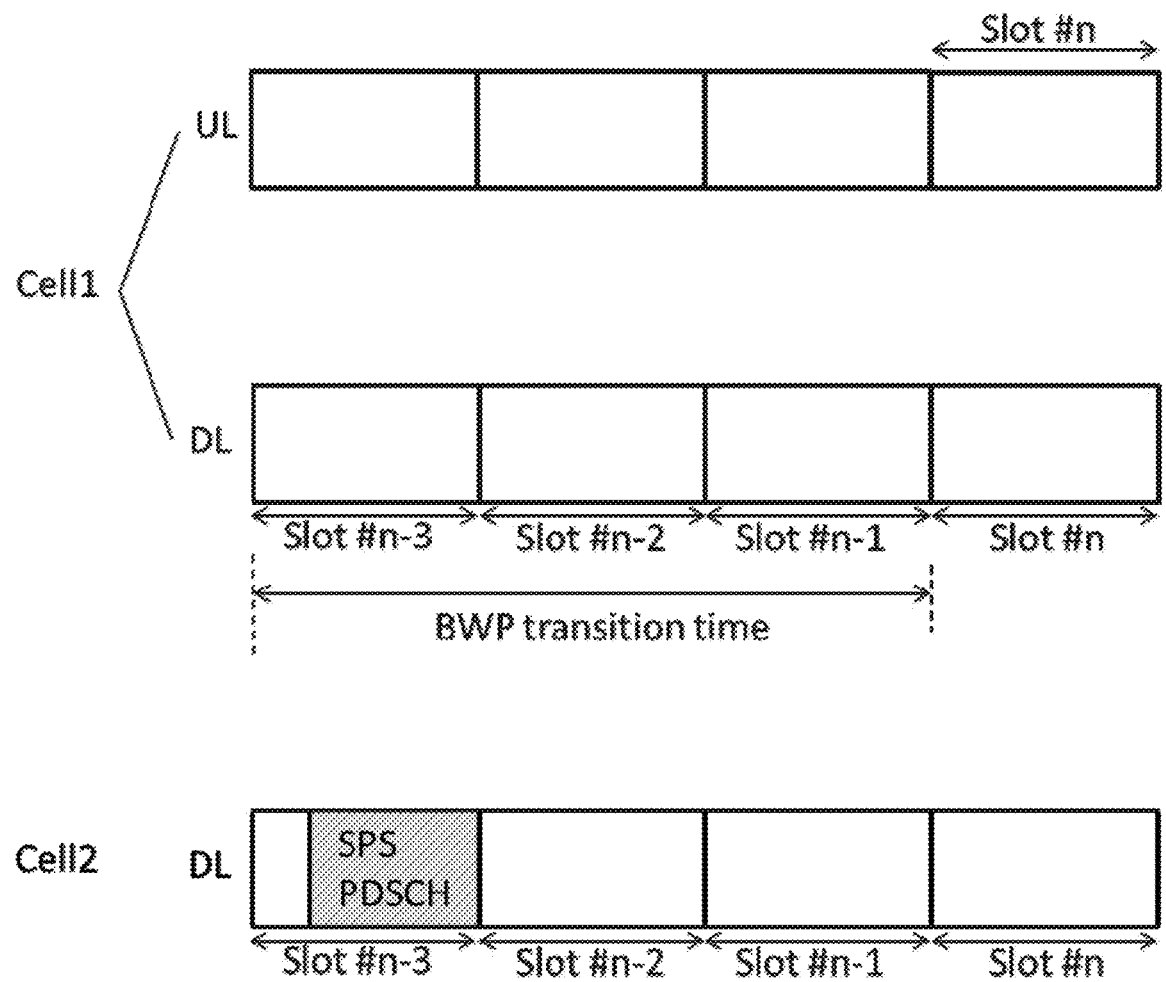
FIG. 9 is a diagram according to one embodiment.

For example, as shown in FIG. 9, a UE is configured to receive PDCCH(s) in cell1, wherein the PDCCH(s) may schedule cell1 and/or cell2 and the UE may determine a first set of occasion(s) for cell1 and a second set of occasion(s) for cell2 based on a set of timing which may be assumed as {0, 1, 2, 3}. In this example, if the UE changes or switches current active DL BWP of cell1 to target active DL BWP of cell1 within a time which the time in this example is assumed from slot #n−3 to slot #n−1, the UE may determine the first set of occasion(s) in slot #n excluding occasion(s) in DL slot #n−1, DL slot #n−2, DL slot #n−3 in cell1. In the same example, if the UE changes or switches current active DL BWP of cell1 to target active DL BWP of cell1 within a time which the time in this example is assumed from slot #n−3 to slot #n−1, the UE may determine the second set of occasion(s) in slot #n excluding occasion(s) in DL slot #n−1. DL slot #n−2. DL slot #n−3 in cell2.

In another example, if the UE receives a SPS-PDSCH on an occasion in DL slot #n−1 in cell2 and the UE changes or switches current active DL BWP of cell1 to target active DL BWP of cell1 within a time which the time in this example is assumed from slot #n−3 to slot #n−1, the UE may determine the second set of occasion(s) in slot #n excluding occasion(s) in DL slot #n−1. DL slot #n−2. DL slot #n−3 in cell2 but adding the occasion in DL slot #n−3 into the second set of occasion(s). In one embodiment, the UE may determine the occasion in DL slot #n−3 to be comprised in the second set of occasion(s) without actually performing the behavior of excluding and then adding.

In one embodiment, if the UE changes or switches current active BWP of the second serving cell to target active BWP of the second serving cell, the UE may exclude occasion(s) from the second set of occasion(s) when determining the second set of occasion(s), wherein the occasions occur prior to (finishing) BWP switching of the second serving cell. In one embodiment, if an occasion in the first serving cell which the UE receives a PDCCH indicating SPS-PDSCH release or SPS PUSCH release in the first serving cell, the UE may take into account the occasion in case BWP switching in the second serving cell when determining the second set of occasion(s) for the second serving cell. The occasion of receiving the PDCCH indicating SPS release in the first serving cell may overlap with the time prior to (finishing) BWP switching of the second serving cell. In one embodiment, taking into account the occasion may mean that the occasion is determined to be comprised in the second set of occasion(s) when determining the second set of occasion(s). Taking into account the occasion may also mean that the occasion is not excluded from the second set of occasion(s) when determining the second set of occasion(s).

Figure 10:
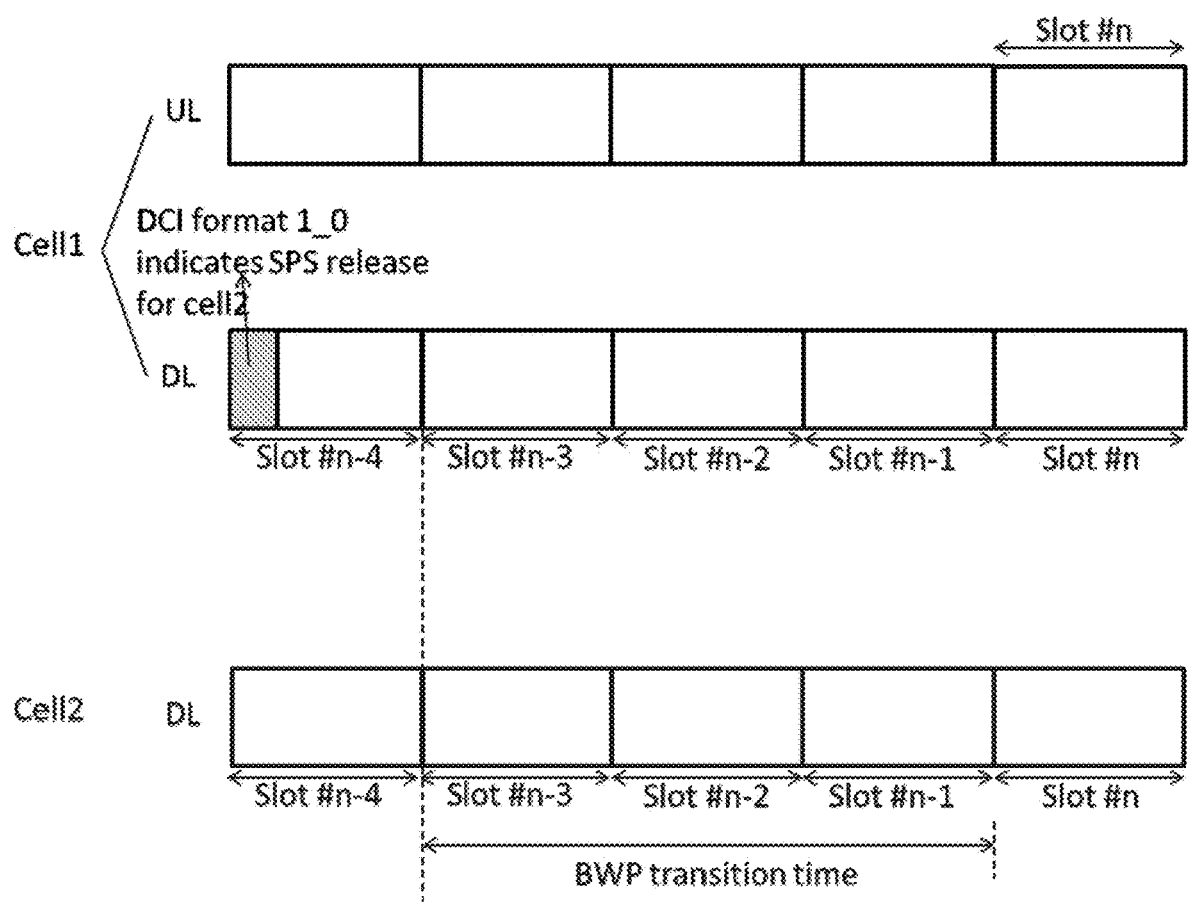
FIG. 10 is a diagram according to one embodiment.

For example, as shown in FIG. 10, a UE could be configured to receive PDCCH(s) in cell1, wherein the PDCCH(s) may schedule cell1 and/or cell2 and the UE may determine a first set of occasion(s) for cell1 and a second set of occasion(s) for cell2 based on a set of timing which may be assumed as {0, 1, 2, 3, 4}. In this example, if the UE changes or switches current active DL BWP of cell2 to target active DL BWP of cell2 within a time which the time in this example is assumed from slot #n−3 to slot #n−1, the UE may determine the second set of occasion(s) in slot #n excluding occasion(s) in DL slot #n−1, DL slot #n−2, DL slot #n−3. DL slot #n−4 in cell2.

In another example, if the UE receives a PDCCH indicating SPS release on an occasion in slot #n−4 in cell1 and the UE changes or switches current active DL BWP of cell2 to target active DL BWP of cell2 within a time which the time in this example is assumed from slot #n−3 to slot #n−1, the UE may determine the second set of occasion(s) in slot #n excluding occasion(s) in DL slot #n−1, DL slot #n−2, DL slot #n−3, DL slot #n−4 in cell2 but adding the occasion in DL slot #n−4 into the second set of occasion(s). In one embodiment, the UE may determine the occasion in DL slot #n−4 to be comprised in the second set of occasion(s) without actually performing the behavior of excluding and then adding. The first serving cell can be PCell or PSCell or SCell. The second serving cell can be the SCell.

A text proposal is provided below:

```
Set j = 0 - index of occasion for candidate PDSCH reception or SPS PDSCH release
Set B = Ø
Set M_{A,c} = Ø
Set K_{1,C} to the cardinality of set K_1
Set k = 0 - index of slot timing values in set K_1
while k < K_{1,C}
    if slot n − K_{1,k} occurs prior to or within change of the active DL BWP and/or the active UL
    BWP of the UE
        k = k+1
    else
        Set R to the set of rows provided by pdsch-symbolAllocation
        Set R_C to the cardinality of R ,
        Set r = 0 - index of row provided by pdsch-symbolAllocation
        while r < R_C
            if the UE is provided higher layer parameter UL-DL-configuration-common, or higher
            layer parameter UL-DL-configuration-common-Set2, or higher layer parameter UL-DL-
            configuration-dedicated and at least one OFDM symbol of the PDSCH time resource
            derived by row r in slot n−K_{1,k} is configured as UL or slot n−K_{1,k} − K_0, does not include
            at least one configured PDCCH monitoring occasion for PDCCH with DCI format 1_0
            or DCI format 1_1, where K_{1,k} is the k-th slot timing value in set K_1 and K_0 is derived
            by row r of pdsch-symbolAllocation,
                R = R \ r ;
            end if
            r = r + 1 ;
        end while
        If the does not UE indicate capability to receive more than one unicast PDSCH per slot
        and R ≠ Ø ,
            M_{A,c} = M_{A,c} ∪ k;
        else
        Set R_C to the cardinality of R
        Set m to the smallest last OFDM symbol index, as determined by the SLIV, among all rows
    of R
        while R ≠ Ø
        Set r = 0
            while r < R_C
                if S ≤ m for start OFDM symbol index S for row r
                    b_{r,k} = j ; - index of occasion for candidate PDSCH reception or SPS PDSCH release
                    associated with row r
                        R = R \ r ;
                        B = B ∪ b_{r,k};
                end if
                r = r + 1 ;
            end while
            M_{A,c} = M_{A,c} ∪ j;
            j = j + 1 ;
            Set m to the smallest last OFDM symbol index among all rows of R ;
        end while
        end if
    k = k + 1 ;
end while
```

Figure 11:
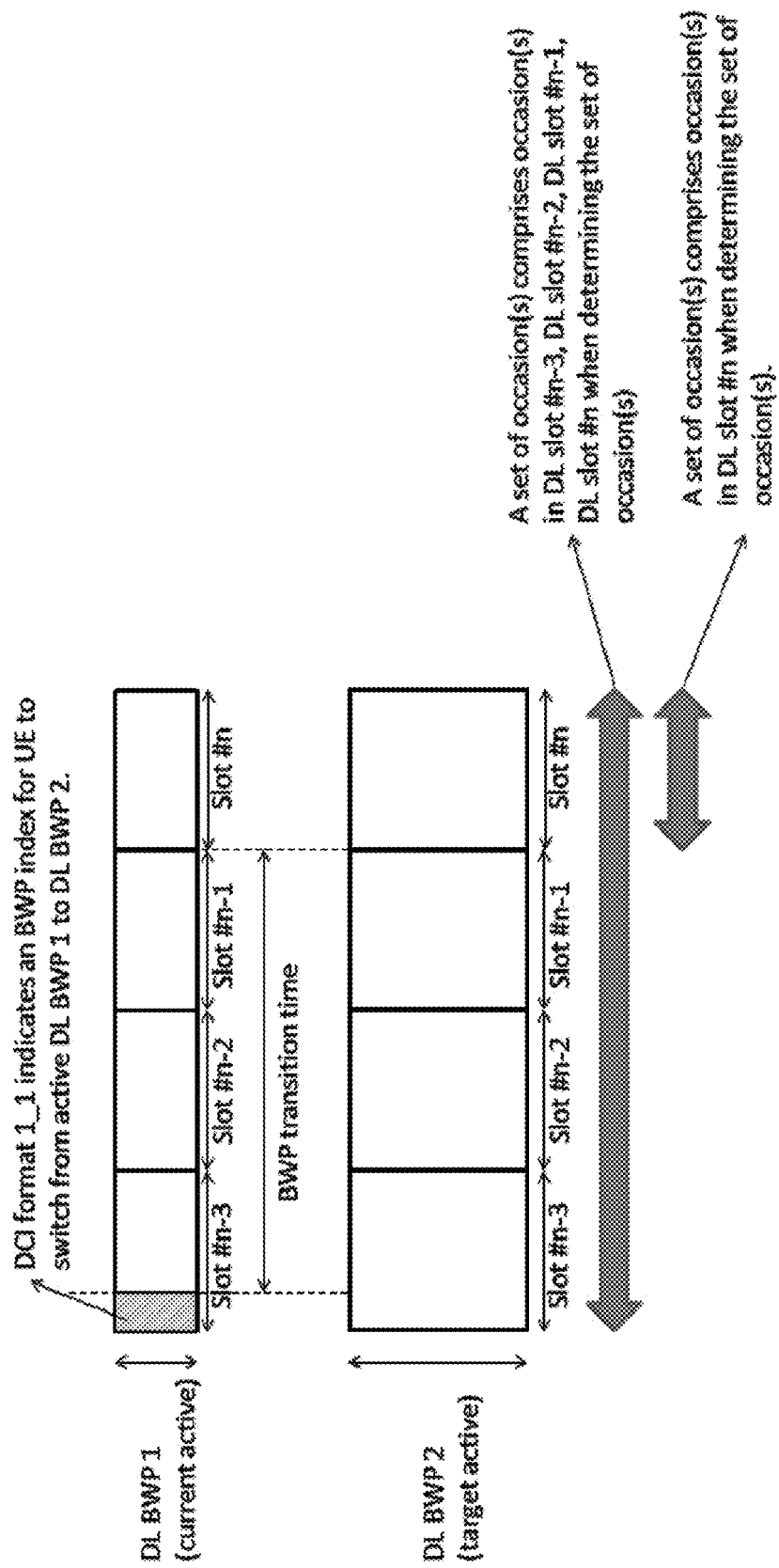
FIG. 11 is a flow chart according to one exemplary embodiment.

FIG. 11 illustrates an example for determining a set of occasion(s) for transmitting HARQ-ACK feedback in slot #n. For paired spectrum, a UE receives a DCI in a control resource set (CORESET) occupying the first two OFDM symbols in slot #n−3 indicating a change from DL BWP 1 to DL BWP 2 and the UE is configured a set of timings as {0, 1, 2, 3}. The first alternative is the UE includes/adds occasion(s) in DL slot #n−3. DL slot #n−2. DL slot #n−2, DL slot #n corresponding to DL BWP2 into a set of occasion(s) when the UE determines the set of occasion(s) in slot #n. The second alternative is the UE excludes occasion(s) in DL slot #n−3, slot #n−2, slot #n−1 corresponding to DL BWP2 into a set of occasion(s) when determining a set of occasion(s) in slot #n.

Figure 12:
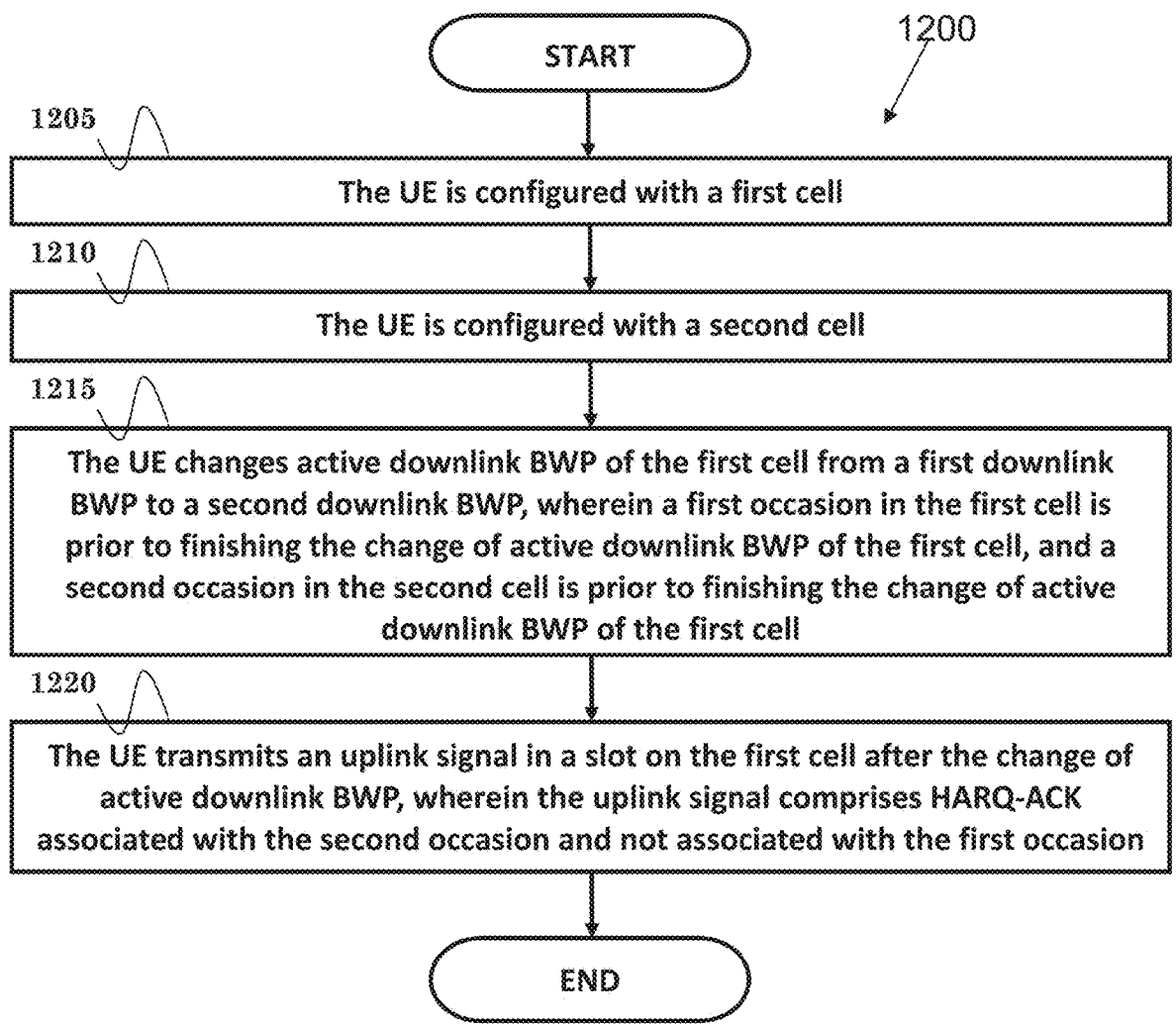
FIG. 12 is a flow chart according to one exemplary embodiment.

FIG. 12 is a flow chart 1200 according to one exemplary embodiment from the perspective of a UE (User Equipment). In step 1205, the UE is configured with a first cell. In step 1210, the UE is configured with a second cell. In step 1215, the UE changes active downlink BWP of the first cell from a first downlink BWP to a second downlink BWP, wherein a first occasion in the first cell is prior to finishing the change of active downlink BWP of the first cell, and a second occasion in the second cell is prior to finishing the change of active downlink BWP of the first cell. In step 1220, the UE transmits an uplink signal in a slot on the first cell after the change of active downlink BWP, wherein the uplink signal comprises HARQ-ACK associated with the second occasion and not associated with the first occasion.

In one embodiment, the first cell may be PCell (Primary Cell) or PSCell (Primary Secondary Cell), and the second cell may be SCell (Secondary Cell). The UE may not change active uplink BWP of the first cell, and the UE may not change active downlink BWP of the second cell.

In one embodiment, the UE could transmit a HARQ-ACK associated to the second occasion. The UE could receive PDSCH (Physical Downlink Shared Channel) or PDCCH (Physical Downlink Control Channel) indicating SPS release on the first occasion. The UE could also receive PDSCH or PDCCH indicating SPS release on the second occasion.

Alternatively, the UE may not receive PDSCH nor PDCCH indicating SPS release on the first occasion. The UE may not receive PDSCH nor PDCCH indicating SPS release on the second occasion.

In one embodiment, the first occasion could be in a first set of occasions associated with the slot, wherein the first set of occasion refers to a default set and/or DL-data-DL-acknowledgement for the first cell; and wherein the second occasion is in a second set of occasions associated with the slot, wherein the second set of occasion refers to a default set and/or DL-data-DL-acknowledgement for the second cell.

In one embodiment, the UE could be configured to transmit HARQ-ACK of the first cell and HARQ-ACK of the second cell on the first cell.

Referring back to FIGS. 3 and 4, in one exemplary embodiment of a UE, the device 300 includes a program code 312 stored in the memory 310. The CPU 308 could execute program code 312 to enable the UE (i) to be configured with a first cell, (ii) to be configured with a second cell, (iii) to change active downlink BWP of the first cell from a first downlink BWP to a second downlink BWP, wherein a first occasion in the first cell is prior to finishing the change of active downlink BWP of the first cell, and a second occasion in the second cell is prior to finishing the change of active downlink BWP of the first cell, and (iv) to transmit an uplink signal in a slot on the first cell after the change of active downlink BWP, wherein the uplink signal comprises HARQ-ACK associated with the second occasion and not associated with the first occasion. Furthermore, the CPU 308 can execute the program code 312 to perform all of the above-described actions and steps or others described herein.

Figure 13:
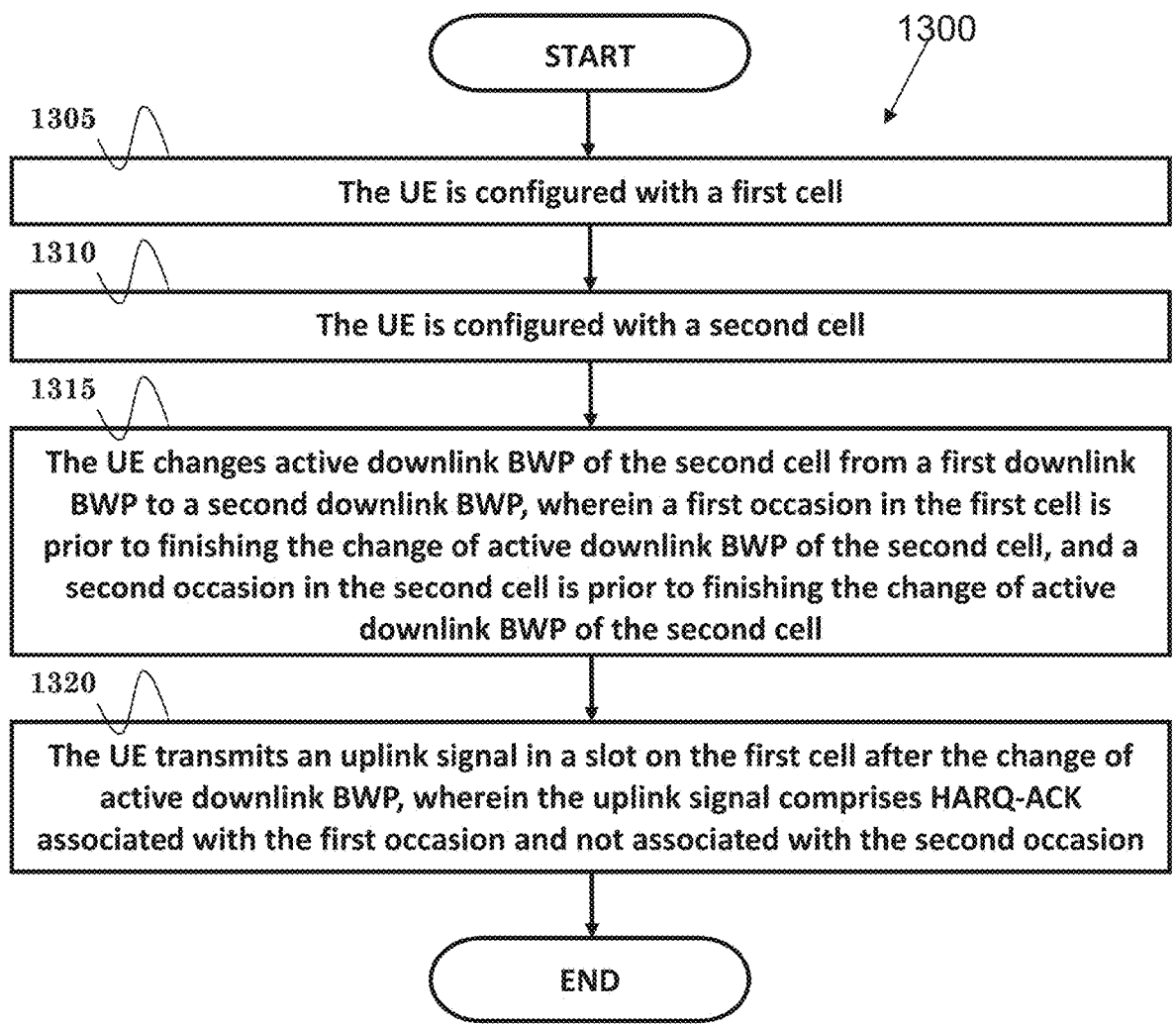
FIG. 13 is a flow chart according to one exemplary embodiment.

FIG. 13 is a flow chart 1300 according to one exemplary embodiment from the perspective of a UE. In step 1305, the UE is configured with a first cell. In step 1310, the UE is configured with a second cell. In step 1315, the UE changes active downlink BWP of the second cell from a first downlink BWP to a second downlink BWP, wherein a first occasion in the first cell is prior to finishing the change of active downlink BWP of the second cell, and a second occasion in the second cell is prior to finishing the change of active downlink BWP of the second cell. In step 1320, the UE transmits an uplink signal in a slot on the first cell after the change of active downlink BWP, wherein the uplink signal comprises HARQ-ACK associated with the first occasion and not associated with the second occasion.

In one embodiment, the first cell may be PCell or PSCell (Primary Secondary Cell), and the second cell may be SCell. The UE may not change active uplink BWP of the first cell, and the UE may not change active downlink BWP of the first cell.

In one embodiment, the UE could transmit a HARQ-ACK associated to the first occasion. The UE could also receive PDSCH or PDCCH indicating SPS release on the first occasion. Alternatively, the UE could receive PDSCH or PDCCH indicating SPS release on the second occasion.

In one embodiment, the UE may not receive PDSCH nor PDCCH indicating SPS release on the first occasion. The UE may not receive PDSCH nor PDCCH indicating SPS release on the second occasion.

In one embodiment, the first occasion may be in a first set of occasions associated with the slot, wherein the first set of occasion refers to a default set and/or DL-data-DL-acknowledgement for the first cell. The second occasion may be in a second set of occasions associated with the slot, wherein the second set of occasion refers to a default set and/or DL-data-DL-acknowledgement for the second cell.

In one embodiment, the UE could be configured to transmit HARQ-ACK of the first cell and HARQ-ACK of the second cell on the first cell.

Referring back to FIGS. 3 and 4, in one exemplary embodiment of a UE, the device 300 includes a program code 312 stored in the memory 310. The CPU 308 could execute program code 312 to enable the UE (i) to be configured with a first cell, (ii) to be configured with a second cell, (iii) to change active downlink BWP of the second cell from a first downlink BWP to a second downlink BWP, wherein a first occasion in the first cell is prior to finishing the change of active downlink BWP of the second cell, and a second occasion in the second cell is prior to finishing the change of active downlink BWP of the second cell, and (iv) to transmit an uplink signal in a slot on the first cell after the change of active downlink BWP, wherein the uplink signal comprises HARQ-ACK associated with the first occasion and not associated with the second occasion. Furthermore, the CPU 308 can execute the program code 312 to perform all of the above-described actions and steps or others described herein.

Figure 14:
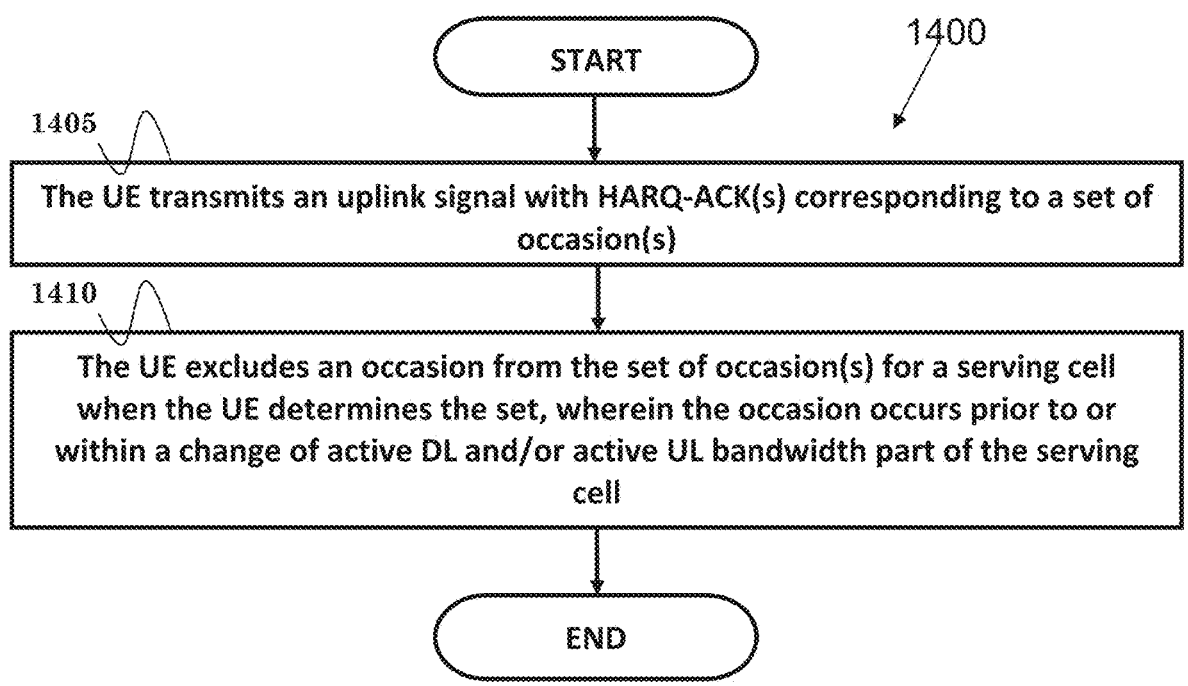
FIG. 14 is a flow chart according to one exemplary embodiment.

FIG. 14 is a flow chart 1400 according to one exemplary embodiment from the perspective of a UE. In step 1405, the UE transmits an uplink signal with HARQ-ACK(s) corresponding to a set of occasion(s). In step 1410, the UE excludes an occasion from the set of occasion(s) for a serving cell when the UE determines the set, wherein the occasion occurs prior to or within a change of active DL and/or active UL bandwidth part of the serving cell. In one embodiment, the occasion in the set could refer to a PDSCH reception occasion or a SPS release PDSCH occasion.

In one embodiment, the UE could determine the set of occasion(s) based on at least a first set of timings and/or a second set of timings. The UE could be configured to transmit and/or receive signal(s) in paired spectrum.

In one embodiment, the first set of timings could refer to DL-data-DL-acknowledgement. The second set of timings could refer to a default set.

In one embodiment, the UE may not switch active DL BWP. The uplink signal could refer to PUCCH and/or PUSCH.

In one embodiment, if the UE detects a DCI format 1_0 with DAI value of 1, wherein the DCI format 1_0 is transmitted in a DL slot prior to the change of active downlink and/or active uplink BWP of the serving cell, the UE could ignore or skip the DCI format 1_0. More specifically, if the UE detects a first DCI format 1_0 with DAI value of 1, wherein the first DCI format 1_0 is transmitted in a DL slot which is based on the first set of timings and/or the second set of timings and is prior to the change of active downlink and/or active uplink BWP of the serving cell, the UE expects to detect a second DCI format 1_0 with DAI value of 1 in a DL slot which is based on the first set of timings and/or the second set of timings and occurs after the change of active downlink and/or active uplink BWP of the serving cell. If the first set of timings and/or the second set of timings do not include value 0, the UE could transmit PUCCH and/or PUSCH in an UL slot without HARQ-ACK corresponding to the set of occasion(s), wherein the UL slot is the first slot after the change of active downlink and/or active uplink BWP of the serving cell.

Referring back to FIGS. 3 and 4, in one exemplary embodiment of a UE, the device 300 includes a program code 312 stored in the memory 310. The CPU 308 could execute program code 312 to enable the UE (i) to transmit an uplink signal with HARQ-ACK(s) corresponding to a set of occasion(s), and (ii) to exclude an occasion from the set of occasion(s) for a serving cell when the UE determines the set, wherein the occasion occurs prior to or within a change of active DL and/or active UL bandwidth part of the serving cell. Furthermore, the CPU 308 can execute the program code 312 to perform all of the above-described actions and steps or others described herein.

Figure 15:
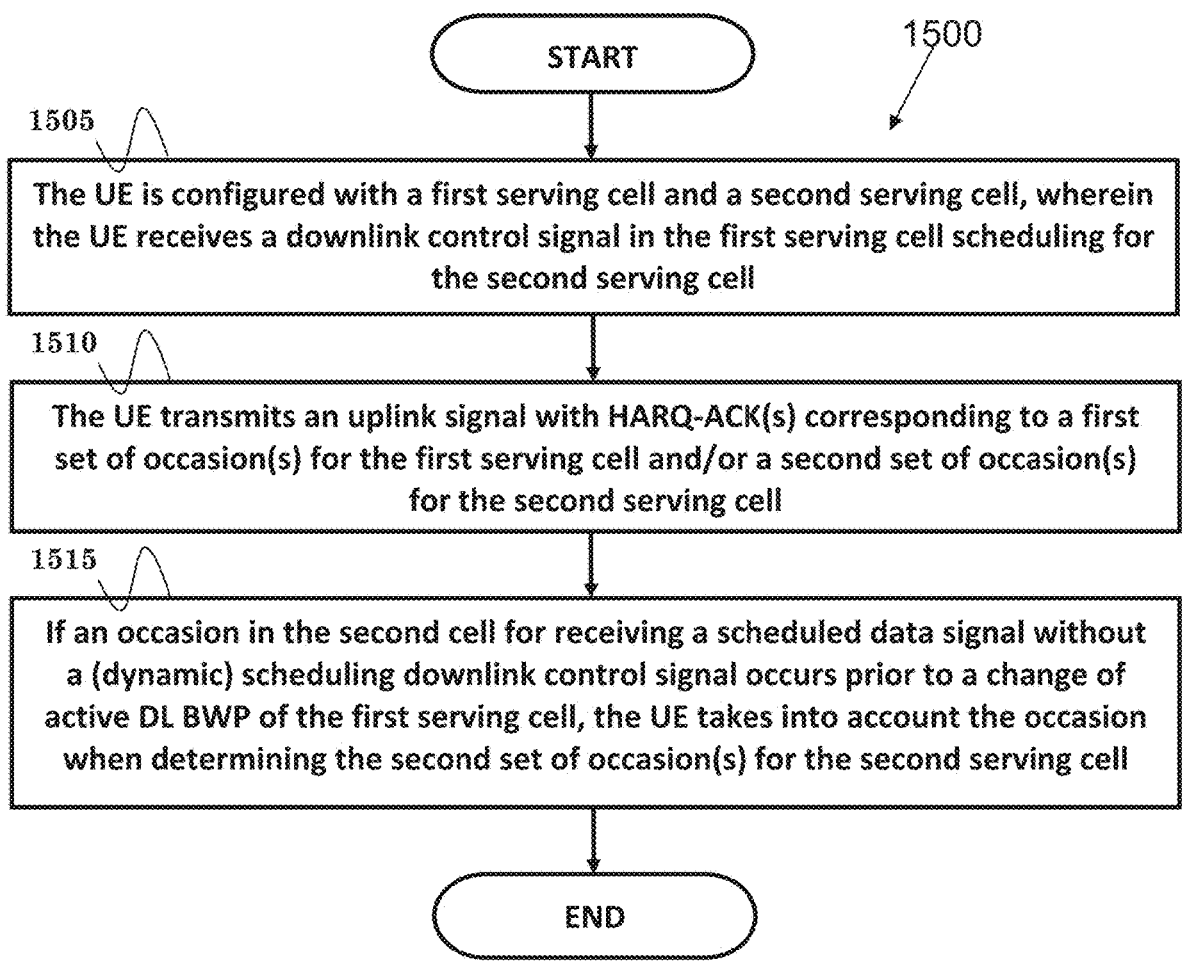
FIG. 15 is a flow chart according to one exemplary embodiment.

FIG. 15 is a flow chart 1500 according to one exemplary embodiment from the perspective of a UE. In step 1505, the UE is configured with a first serving cell and a second serving cell, wherein the UE receives a downlink control signal in the first serving cell scheduling for the second serving cell. In step 1510, the UE transmits an uplink signal with HARQ-ACK(s) corresponding to a first set of occasion(s) for the first serving cell and/or a second set of occasion(s) for the second serving cell. In step 1515, if an occasion in the second cell for receiving a scheduled data signal without a (dynamic) scheduling downlink control signal occurs prior to a change of active DL BWP of the first serving cell, the UE takes into account the occasion when determining the second set of occasion(s) for the second serving cell.

In one embodiment, the occasion can refers to SPS PDSCH reception occasion, the UE could determine the first set of occasion(s) based on at least a first set of timings and/or a second set of timings. The UE could also determine the second set of occasion(s) based on at least the first set of timings and/or the second set of timings.

In one embodiment, the UE could be configured to transmit and/or receive signal(s) in paired spectrum. The first set of timings could refer to DL-data-DL-acknowledgement. The second set of timings could refer to a default set.

In one embodiment, if the UE detects a DCI format 1_0 with DAI value of 1, wherein the DCI format 1_0 is transmitted in a DL slot prior to the change of active downlink BWP of the first serving cell, the UE could ignore or skip the DCI format 1_0. More specifically, if the UE detects a first DCI format 1_0 with DAI value of 1, wherein the first DCI format 1_0 is transmitted in a DL slot which is based on the first set of timings and/or the second set of timings and is prior to the change of active downlink BWP of the first serving cell, the UE expects to detect a second DCI format 1_0 with DAI value of 1 in a DL slot which is based on the first set of timings and/or the second set of timings and occurs after the change of active downlink BWP of the first serving cell. If the first set of timings and/or the second set of timings do not include value 0, the UE could transmit PUCCH and/or PUSCH in an UL slot without HARQ-ACK corresponding to the second set of occasion(s), wherein the UL slot is the first slot after the change of active downlink BWP of the first serving cell.

Referring back to FIGS. 3 and 4, in one exemplary embodiment of a UE, the device 300 includes a program code 312 stored in the memory 310. The CPU 308 could execute program code 312 to enable the UE (i) to be configured with a first serving cell and a second serving cell, wherein the UE receives a downlink control signal in the first serving cell scheduling for the second serving cell. (ii) to transmit an uplink signal with HARQ-ACK(s) corresponding to a first set of occasion(s) for the first serving cell and/or a second set of occasion(s) for the second serving cell, and (iii) to take into account the occasion when determining the second set of occasion(s) for the second serving cell if an occasion in the second cell for receiving a scheduled data signal without a (dynamic) scheduling downlink control signal occurs prior to a change of active DL BWP of the first serving cell. Furthermore, the CPU 308 can execute the program code 312 to perform all of the above-described actions and steps or others described herein.

Figure 16:
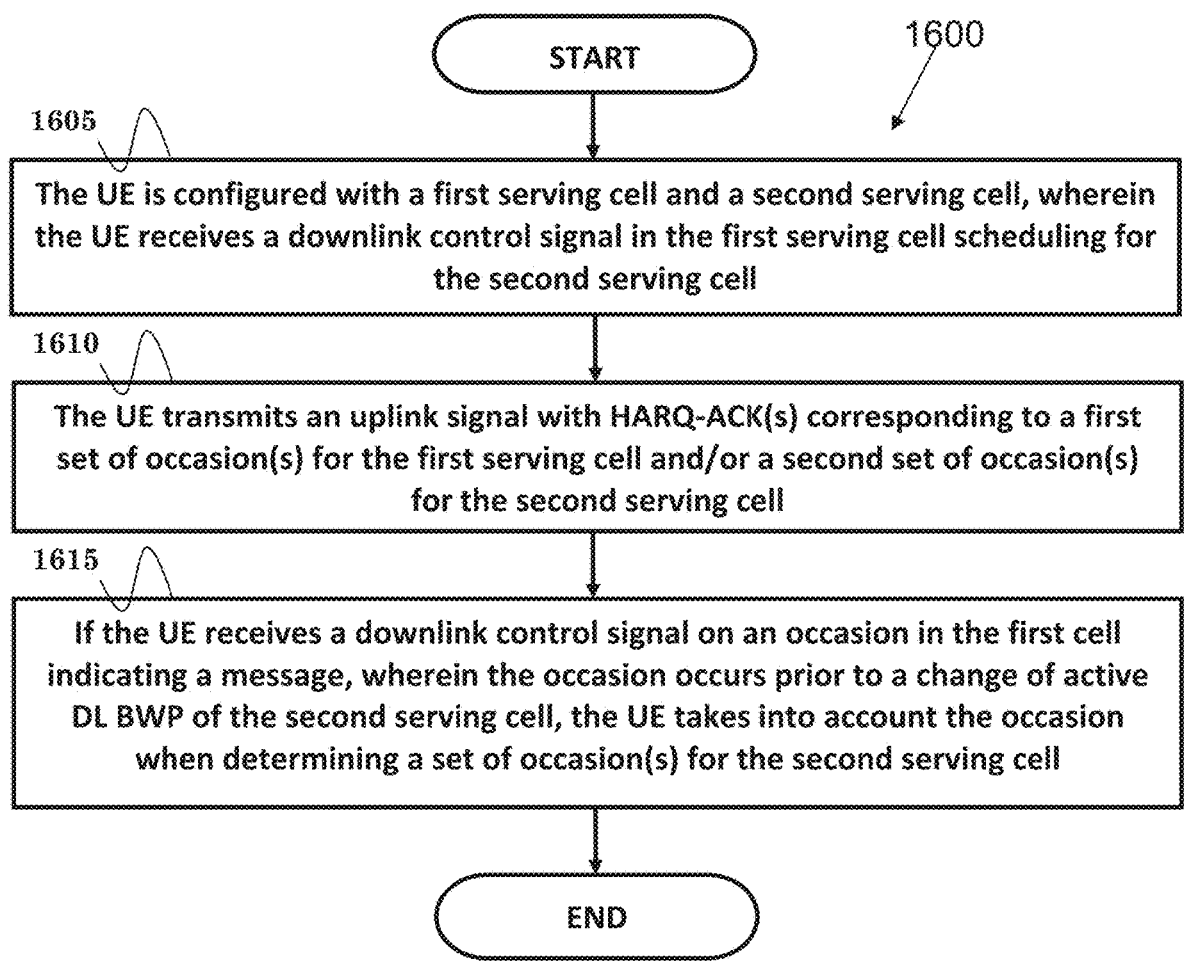
FIG. 16 is a flow chart according to one exemplary embodiment.

FIG. 16 is a flow chart 1600 according to one exemplary embodiment from the perspective of a UE. In step 1605, the UE is configured with a first serving cell and a second serving cell, wherein the UE receives a downlink control signal in the first serving cell scheduling for the second serving cell. In step 1610, the UE transmits an uplink signal with HARQ-ACK(s) corresponding to a first set of occasion(s) for the first serving cell and/or a second set of occasion(s) for the second serving cell. In step 1615, if the UE receives a downlink control signal on an occasion in the first cell indicating a message, wherein the occasion occurs prior to a change of active DL BWP of the second serving cell, the UE takes into account the occasion when determining a set of occasion(s) for the second serving cell.

In one embodiment, the UE could determine the first set of occasion(s) based on at least a first set of timings and/or a second set of timings. The UE could also determine the second set of occasion(s) based on at least the first set of timings and/or the second set of timings. The UE could transmit a HARQ-ACK for the occasion.

In one embodiment, the message may refer to DL SPS PDSCH release and/or UL SPS PUSCH release for the second serving cell. The UE could be configured to transmit and/or receive signal(s) in paired spectrum.

In one embodiment, the first set of timings could refer to DL-data-DL-acknowledgement. The second set of timings could refer to a default set.

In one embodiment, if the UE detects a DCI format 1_0 with DAI value of 1, wherein the DCI format 1_0 is transmitted in a DL slot prior to the change of active downlink BWP of the second serving cell, the UE could ignore or skip the DCI format 1_0. If the UE detects a first DCI format 1_0 with DAI value of 1, wherein the first DCI format 1_0 is transmitted in a DL slot which is based on the first set of timings and/or the second set of timings and is prior to the change of active downlink BWP of the second serving cell, the UE expects to detect a second DCI format 1_0 with DAI value of 1 in a DL slot which is based on the first set of timings and/or the second set of timings and occurs after the change of active downlink BWP of the second serving cell. If the first set of timings and/or the second set of timings do not include value 0, the UE could transmit PUCCH and/or PUSCH in an UL slot without HARQ-ACK corresponding to the set of occasion(s), wherein the UL slot is the first slot after the change of active downlink BWP of the second serving cell.

Referring back to FIGS. 3 and 4, in one exemplary embodiment of a UE, the device 300 includes a program code 312 stored in the memory 310. The CPU 308 could execute program code 312 to enable the UE (i) to be configured with a first serving cell and a second serving cell, wherein the UE receives a downlink control signal in the first serving cell scheduling for the second serving cell. (ii) to transmit an uplink signal with HARQ-ACK(s) corresponding to a first set of occasion(s) for the first serving cell and/or a second set of occasion(s) for the second serving cell, and (iii) to receive a downlink control signal on an occasion in the first cell indicating a message, wherein the occasion occurs prior to a change of active DL BWP of the second serving cell, the UE takes into account the occasion when determining a set of occasion(s) for the second serving cell. Furthermore, the CPU 308 can execute the program code 312 to perform all of the above-described actions and steps or others described herein.

In the context of the embodiments illustrated in FIGS. 15 and 16 and described above, in one embodiment, taking into account the occasion could mean that the occasion is determined to be comprised in the set of occasion(s) for the second serving cell when determining the set of occasion(s)

for the second serving cell. Taking into account the occasion could also mean that the occasion is not excluded from the set of occasion(s) for the second serving cell when determining the set of occasion(s) for the second serving cell.

In one embodiment, the UE could perform the transmission of the uplink signal with HARQ-ACK(s) in the first serving cell. The first serving cell could be PCell or PSCell or SCell. The second serving cell could be SCell. The SPS release PDSCH occasion could mean reception occasion of a PDCCH indicating SPS PDSCH release.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory. ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:
1. A method for a UE (User Equipment), comprising:
the UE is configured with a first cell;
the UE is configured with a second cell;
the UE changes active downlink BWP (Bandwidth Part) of the first cell from a first downlink BWP to a second downlink BWP, wherein a first occasion in the first cell is prior to finishing the change of active downlink BWP of the first cell, and a second occasion in the second cell is prior to finishing the change of active downlink BWP of the first cell; and the UE transmits an uplink signal in a slot on the first cell after the change of active downlink BWP, wherein the uplink signal comprises HARQ-ACK (Hybrid Automatic Repeat Request Acknowledgment) associated with the second occasion and not associated with the first occasion.

2. The method of claim 1, wherein the first cell is PCell (Primary Cell) or PSCell (Primary Secondary Cell), and the second cell is SCell (Secondary Cell).

3. The method of claim 1, wherein the UE does not change active uplink BWP of the first cell, and the UE does not change active downlink BWP of the second cell.

4. The method of claim 1, wherein the UE transmits a HARQ-ACK associated to the second occasion.

5. The method of claim 1, wherein the UE receives PDSCH (Physical Downlink Shared Channel) or PDCCH (Physical Downlink Control Channel) indicating SPS (Semi-Persistent Scheduling) release on the first occasion.

6. The method of claim 1, wherein the UE receives PDSCH (Physical Downlink Shared Channel) or PDCCH (Physical Downlink Control Channel) indicating SPS (Semi-Persistent Scheduling) release on the second occasion.

7. The method of claim 1, wherein the UE does not receive PDSCH (Physical Downlink Shared Channel) nor PDCCH (Physical Downlink Control Channel) indicating SPS (Semi-Persistent Scheduling) release on the first occasion.

8. The method of claim 1, wherein the UE does not receive PDSCH (Physical Downlink Shared Channel) nor PDCCH (Physical Downlink Control Channel) indicating SPS (Semi-Persistent Scheduling) release on the second occasion.

9. The method of claim 1, wherein the first occasion is in a first set of occasions associated with the slot, wherein the first set of occasion refers to a default set and/or DL-data-DL-acknowledgement for the first cell; and wherein the second occasion is in a second set of occasions associated with the slot, wherein the second set of occasion refers to a default set and/or DL-data-DL-acknowledgement for the second cell.

10. The method of claim 1, wherein the UE is configured to transmit HARQ-ACK of the first cell and HARQ-ACK of the second cell on the first cell.

11. A method for a UE (User Equipment), comprising:
the UE is configured with a first cell;
the UE is configured with a second cell;
the UE changes active downlink BWP (Bandwidth Part) of the second cell from a first downlink BWP to a second downlink BWP, wherein a first occasion in the first cell is prior to finishing the change of active downlink BWP of the second cell, and a second occasion in the second cell is prior to finishing the change of active downlink BWP of the second cell; and the UE transmits an uplink signal in a slot on the first cell after the change of active downlink BWP, wherein the uplink signal comprises HARQ-ACK (Hybrid Automatic Repeat Request Acknowledgment) associated with the first occasion and not associated with the second occasion.

12. The method of claim 11, wherein the first cell is PCell (Primary Cell) or PSCell (Primary Secondary Cell), and the second cell is SCell (Secondary Cell).

13. The method of claim 11, wherein the UE does not change active uplink BWP of the first cell, and the UE does not change active downlink BWP of the first cell.

14. The method of claim 11, wherein the UE transmits a HARQ-ACK associated to the first occasion.

15. The method of claim 11, wherein the UE receives PDSCH (Physical Downlink Shared Channel) or PDCCH (Physical Downlink Control Channel) indicating SPS (Semi-Persistent Scheduling) release on the first occasion.

16. The method of claim 11, wherein the UE receives PDSCH (Physical Downlink Shared Channel) or PDCCH (Physical Downlink Control Channel) indicating SPS (Semi-Persistent Scheduling) release on the second occasion.

17. The method of claim 11, wherein the UE does not receive PDSCH (Physical Downlink Shared Channel) nor PDCCH (Physical Downlink Control Channel) indicating SPS (Semi-Persistent Scheduling) release on the first occasion.

18. The method of claim 11, wherein the UE does not receive PDSCH (Physical Downlink Shared Channel) nor PDCCH (Physical Downlink Control Channel) indicating SPS (Semi-Persistent Scheduling) release on the second occasion.

19. The method of claim 11, wherein the first occasion is in a first set of occasions associated with the slot, wherein the first set of occasion refers to a default set and/or DL-data-DL-acknowledgement for the first cell; and wherein the second occasion is in a second set of occasions associated with the slot, wherein the second set of occasion refers to a default set and/or DL-data-DL-acknowledgement for the second cell.

20. The method of claim 11, wherein the UE is configured to transmit HARQ-ACK of the first cell and HARQ-ACK of the second cell on the first cell.

* * * * *